US006678423B1

(12) United States Patent
Trenary et al.

(10) Patent No.: US 6,678,423 B1
(45) Date of Patent: Jan. 13, 2004

(54) SHIFT AND/OR MERGE OF TRANSFORMED DATA ALONG TWO AXES

(75) Inventors: Timothy J. Trenary, Fort Collins, CO (US); Joan L. Mitchell, Longmont, CO (US); Charles A. Micchelli, Mohegan Lake, NY (US); Marco Martens, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,389

(22) Filed: Mar. 13, 2000

(51) Int. Cl.$^7$ .............................. G06K 9/36; G06K 9/32
(52) U.S. Cl. ...................... 382/250; 382/277; 382/248; 382/280; 382/244; 382/294; 382/300
(58) Field of Search .............................. 382/232, 233, 382/240, 244, 248, 250, 251, 276, 277, 280, 282, 294, 300, 305; 375/240.2, 240.26, 240.17, 240.18, 240.01; 348/395.1, 405.1, 441; 345/619, 628; 358/426.01, 426.16, 428, 453; 708/290, 400, 401, 402

(56) References Cited

U.S. PATENT DOCUMENTS

| | | | | |
|---|---|---|---|---|
| 4,894,713 A | * | 1/1990 | Delogne et al. | 375/240.2 |
| 5,455,874 A | * | 10/1995 | Ormsby et al. | 382/251 |
| 6,115,070 A | * | 9/2000 | Song et al. | 375/240.12 |
| 6,256,422 B1 | * | 7/2001 | Mitchell et al. | 382/248 |
| 6,393,155 B1 | * | 5/2002 | Bright et al. | 382/248 |
| 6,473,533 B1 | * | 10/2002 | Yokose et al. | 382/248 |

OTHER PUBLICATIONS

Ut–Va Koc, et al., "Interpolation–Free Subpixel Motion Estimation Techniques in DCT Domain", IEEE Transactions on Circuits and Systems for Video Technology, vol. 8, No. 4, Aug. 1998.

Ut–Va Koc, et al., "DCT–Based Motion Estimation", IEEE Transactions on Image Processing, vol. 7, No. 7, Jul. 1998.

Shih–Fu Chang, et al., "Manipulation and Compositing of MC–DCT Compressed Video", IEEE Journal on Selected Areas in communications, vol. 13, No. 1, Jan. 1995.

Weidong Kou et al., "A Direct Computation of DCT Coefficients for a Signal Block Taken from Two Adjacent Blocks", IEEE Transactions on Signal Processing, vol. 29, No. 7, Jul. 1991.

Soo–Chang Pei et al., "High Resolution Wigner Distribution Using Chirp Z–Transform Analysis", IEEE Transactions on Signal Processing, vol. 29, No. 7, Jul. 1991.

* cited by examiner

Primary Examiner—Andrew W. Johns
Assistant Examiner—Amir Alavi
(74) Attorney, Agent, or Firm—Whitham, Curtis & Christofferson, P.C.; Stephen C. Kaufman

(57) ABSTRACT

A one-dimensional algorithm for perform the merging of complementary portions from two independent overlapped images on the same 8×8 grid without the computational expense of conversion to and from the real domain is extended to a two-dimensional procedure. The merging process is performed exclusively in the frequency domain. The extension to two dimensions is done by shifting and/or merging rows of side-by-side two-dimensional transformed data blocks using the one-dimensional algorithm. Then a vertical shifting and/or merging can be performed on the horizontally shifted and/or merged blocks again using the one-dimensional algorithm with an independent shift/merge parameter.

31 Claims, 22 Drawing Sheets

$$a_{ij} = Q_j(\text{FROM G})a'_{ij}$$
$$b_{ij} = Q_j(\text{FROM H})b'_{ij}$$

$$a_{ij} = a'_{ij} / Q_j(\text{OUTPUT})$$
$$b_{ij} = b'_{ij} / Q_j(\text{OUTPUT})$$

SHIFT AND/OR MERGE OF TRANSFORMED DATA ALONG TWO AXES

CROSS REFERENCE TO RELATED APPLICATIONS

The present application is related to the following U.S. patent applications: Ser. No. 09/186,245 filed Nov. 4, 1998, by Joan L. Mitchell and Martin J. Bright for "Transform-Domain Correction of Real Domain Errors", Ser. No. 09/186,249 filed Nov. 4, 1998, by Martin J. Bright and Joan L. Mitchell for "Error Reduction in Transformed Digital Data", Ser. No. 09/186,247 filed Nov. 4, 1998, by Martin J. Bright and Joan L. Mitchell for "Reduced-error Processing of Transformed Digital Data" and Ser. No. 09/524,266 filed concurrently herewith by Charles A. Micchelli, Marco Martens, Timothy J. Trenary and Joan L. Mitchell for "Shift and/or Merge of Transformed Data Along One Axis", all assigned to a common assignee with this application and the disclosures of which are incorporated herein by reference.

BACKGROUND OF THE INVENTION

Field of the Invention

This invention relates to transform coding of digital data, specifically to real domain processing of transform data and, more particularly, to a shift and/or merge of transformed data which increases the speed of, for example, processing of color images printed by color printers. The invention implements an efficient two-dimensional method for merging and shifting JPEG (Joint Photographic Experts Group) images in the Discrete Cosine Transform (DCT) domain. Since each dimension is handled by one-dimensional methods, the shift or merge amounts are independent for the two axes.

Background Description

Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be for example a spectral or spectrum analysis, an image, an audio clip, a video clip, etc. The transform function is usually chosen to reflect some quality of the phenomenon being coded; for example, in coding of audio, still images and motion pictures, the Fourier transform or Discrete Cosine Transform (DCT) can be used to analyze the data into frequency terms or coefficients. Given the phenomenon being compressed, there is generally a concentration of the information into a few frequency coefficients. Therefore, the transformed data can often be more economically encoded or compressed than the original data. This means that transform coding can be used to compress certain types of data to minimize storage space or transmission time over a communication link.

An example of transform coding in use is found in the Joint Photographic Experts Group (JPEG) international standard for still image compression, as defined by *ITU-T Rec. T.81* (1992)|*ISO/IEC* 10918–1:1994, Information technology—Digital compression and coding of continuous-tone still images, Part 1. Requirements and Guidelines. Another example is the Moving Pictures Experts Group (MPEG) international standard for motion picture compression, defined by *ISO/IEC* 11172:1993, Information Technology—Coding of moving pictures and associated audio for digital storage media at up to about 1.5 Mbits/s. This MPEG-1 standard defines systems for both video compression (Part 2 of the standard) and audio compression (Part 3). A more recent MPEG video standard (MPEG-2) is defined by *ITU-T Rec. H.262*|*ISO/IEC* 13818–2: 1996 Information Technology—Generic Coding of moving pictures and associated audio—Part 2: video. A newer audio standard is *ISO/IEC* 13818–3: 1996 Information Technology—Generic Coding of moving pictures and associated audio—Part 3: audio. All three image international data compression standards use the DCT on 8×8 blocks of samples to achieve image compression. DCT compression of images is used herein to give illustrations of the general concepts put forward below; a complete explanation can be found in Chapter 4 "The Discrete Cosine Transform (DCT)" in W. B. Pennebaker and J. L. Mitchell, *JPEG: Still Image Data Compression Standard*, Van Nostrand Reinhold: New York, (1993).

Wavelet coding is another form of transform coding. Special localized basis functions allow wavelet coding to preserve edges and small details. For compression the transformed data is usually quantized. Wavelet coding is used for fingerprint identification by the Federal Bureau of Investigation (FBI). Wavelet coding is a subset of the more general subband coding technique. Subband coding uses filter banks to decompose the data into particular bands. Compression is achieved by quantizing the lower frequency bands more finely than the higher frequency bands while sampling the lower frequency bands more coarsely than the higher frequency bands. A summary of wavelet, DCT, and other transform coding is given in Chapter 5 "Compression Algorithms for Diffuse Data" in Roy Hoffman, *Data Compression in Digital Systems*, Chapman and Hall: New York, (1997).

In any technology and for any phenomenon represented by digital data, the data before a transformation is performed are referred to as being "in the real domain". After a transformation is performed, the new data are often called "transform data" or "transform coefficients", and referred to as being "in the transform domain". The function used to take data from the real domain to the transform domain is called the "forward transform". The mathematical inverse of the forward transform, which takes data from the transform domain to the real domain, is called the respective "inverse transform".

In general, the forward transform will produce real-valued data, not necessarily integers. To achieve data compression, the transform coefficients are converted to integers by the process of quantization. Suppose that $(\lambda_i)$ is a set of real-valued transform coefficients resulting from the forward transform of one unit of data. Note that one unit of data may be a one-dimensional or two-dimensional block of data samples or even the entire data. The "quantization values" $(q_i)$ are parameters to the encoding process. The "quantized transform coefficients" or "transform-coded data" are the sequence of values $(a_i)$ defined by the quantization function Q:

$$a_i = Q(\lambda_i) = \left\lfloor \frac{\lambda_i}{q_i} + 0.5 \right\rfloor, \qquad (1)$$

where $\lfloor x \rfloor$ means the greatest integer less than or equal to x.

The resulting integers are then passed on for possible further encoding or compression before being stored or transmitted. To decode the data, the quantized coefficients are multiplied by the quantization values to give new "dequantized coefficients" ($q_i'$) given by $$\lambda_i' = q_i a_i. \quad (2)$$

The process of quantization followed by de-quantization (also called inverse quantization) can thus be described as "rounding to the nearest multiple of $q_i$". The quantization values are chosen so that the loss of information in the quantization step is within some specified bound. For example, for audio or image data, one quantization level is usually the smallest change in data that can be perceived. It is quantization that allows transform coding to achieve good data compression ratios. A good choice of transform allows quantization values to be chosen which will significantly cut down the amount of data to be encoded. For example, the DCT is chosen for image compression because the frequency components which result produce almost independent responses from the human visual system. This means that the coefficients relating to those components to which the visual system is less sensitive, namely the high-frequency components, may be quantized using large quantization values without loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the playback of audio data or the display of image data generally accept input in the form of integers. For this reason, a transform decoder generally includes a step that converts the non-integer data from the inverse transform to integer data, either by truncation or by rounding to the nearest integer. There is also often a limit on the range of the integer data output from the decoding process in order that the data may be stored in a given number of bits. For this reason the decoder also often includes a "clipping" stage that ensures that the output data are in an acceptable range. If the acceptable range is [a, b], then all values less than a are changed to a, and all values greater than b are changed to b.

These rounding and clipping processes are often considered an integral part of the decoder, and it is these which are the cause of inaccuracies in decoded data and in particular when decoded data are re-encoded. For example, the JPEG standard (Part 1) specifies that a source image sample is defined as an integer with precision P bits, with any value in the range 0 to $2^{P-1}$. The decoder is expected to reconstruct the output from the inverse discrete cosine transform (IDCT) to the specified precision. For the baseline JPEG coding P is defined to be 8; for other JPEG DCT-based coding P can be 8 or 12. The MPEG-2 video standard states in Annex A (Discrete Cosine Transform), "The input to the forward transform and the output from the inverse transform is represented with 9 bits."

For the JPEG standard, the compliance test data for the encoder source image test data and the decoder reference test data are 8 bit/sample integers. Even though rounding to integers is typical, some programming languages convert from floating point to integers by truncation. Implementations in software that accept this conversion to integers by truncation introduce larger errors into the real-domain integer output from the inverse transform.

The term "high-precision" is used herein to refer to numerical values which are stored to a precision more accurate than the precision used when storing the values as integers. Examples of high-precision numbers are floating-point or fixed-point representations of numbers.

In performing a printing operation, there is a need for the printer to be able to merge a portion of an 8×8 Discrete Cosine Transform (DCT) domain block with the complementary portion of a second DCT block quickly. The traditional approach involves conversion from the DCT domain for each of the original blocks to the respective real domains (each a 64-bit sample space) via an inverse DCT followed by merging the components of interest from each block in the real domain and finally transforming this new image back to the DCT domain. This method involves more computations than is necessary and lengthens total processing time.

While it is commonplace for graphics utilities to merge two independent images with brute force pixel-by-pixel merges as described above, it is also possible to approach the problem by working exclusively in the frequency domain. This approach potentially has at least two advantages over the traditional method in that it (1) provides for faster and more flexible image processing for the printing industry than is available with current technologies and (2) eliminates errors which routinely take place when working in the real domain with fixed precision computation by avoiding the real domain entirely.

Ut-Va Koc and K. J. Ray Liu in "DCT-Based Motion Estimation", *IEEE Transactions on Image Processing*, Vol. 7, No. 7, July 1998, pp. 948–965, and Ut-Va Koc and K. J. Ray Liu in "Interpolation-Free Subpixel Motion Estimation Techniques in DCT Domain", *IEEE Transactions on Circuits and Systems for Video Technology*, Vol. 8., No. 4, August 1998, pp. 460–487, describe a method by which pixel motion can be approximated in subsequent image frames. The key mechanism in both articles is the construction of impulse functions derived from the inverse discrete cosine transform (IDCT) and inverse discrete sine transform (IDST) of pseudo phases which express a relationship between the discrete cosine transform (DCT) and discrete sine transform (DST) of temporarily shifted image samples. The key difference between the two articles is that the second article extends the first to enable detection of motion at the subpixel level. Neither article teaches including the de-quantization and/or re-quantization in the impulse solutions.

Shih-Fu Chang and David G. Messerschmitt in "Manipulation of Compositing of MC-DCT Compressed Video", *IEEE Journal on Selected Areas in Communications*, Vol. 13, No. 1, January 1995, pp. 1–11, describe compression algorithms using discrete cosine transform (DCT) with or with out motion compensation (MC). Compression systems of this kind include JPEG (Joint Photographic Experts Group), motion JPEG, MPEG (Moving Picture Experts Group), and the H.261 standard. Chang and Messerschmitt derive a set of algorithms in which video signals are represented by quantized transform coefficients. Their paper uses the term "quantized DCT coefficients" to mean the de-quantized coefficients since they explain that these quantized DCT coefficients "can be obtained after the inverse quantizer in the decoder . . . " (p.2). Footnote 2 notes, " . . . we assume the transform coefficients are by default quantized, so we can take advantage of the fact that many coefficients are truncated to zero after quantization." The de-quantization and/or re-quantization are not included in their transform domain equations and operations.

A comparison of the complexity of computation in Chang and Messerschmitt's method and that of the present invention may be illustratively made by comparing the performance at the one-dimensional block level. Consider the following sub-block acquisition from two 1×8 blocks G and H:

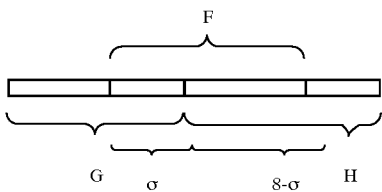

Appealing to the approach suggested by Chang and Messerschmitt, we first write $$F = M_1 G + M_2 H,$$

where $$M_1 = \begin{bmatrix} 0 & I_\sigma \\ 0 & 0 \end{bmatrix} \text{ and } M_2 = \begin{bmatrix} 0 & 0 \\ I_{8-\sigma} & 0 \end{bmatrix},$$

and apply the FDCT operator D to get $$DF = DM_1 G + DM_2 H$$
$$= DM_1 D^T DG + DM_2 D^T DH$$
$$= DCT(M_1) \cdot DCT(G) + DCT(M_2) \cdot DCT(H),$$

where we use the fact that $DD^T = I_8$ and $DAD^T$ is the two-dimensional DCT of the 8×8 matrix A. At a "worst case" level, the one-dimensional computation in Chang and Messerschmitt requires 64 × 2 = 128 multiplications and
56 × 2 + 8 = 120 additions, (7 adds/row for each matrix result)   (to add the 2 results)

whereas the one-dimensional method according to the invention disclosed in co-pending patent application Ser. No. 09/524,266 requires 95 multiplications and 103 additions. Using our present invention to extend the method to two-dimensional 8×8 blocks, for shift along only one axis, the Chang and Messcherschmitt formula extended requires 1024 (8×128) multiplications and 960 (8×120) additions. Our worst case, a shift of 1, requires for the same eight rows in the 8×8 block 760 (8×95) multiplications and 824 (8×103) additions. Our best case, a merge using half from each block, requires just 320 (8×40) multiplications and 384 (8×48) additions. Additional performance improvements can be gained by using our "fast paths".

Weidong Kou and Tore Fjällbrant in "A Direct Computation of DCT Coefficients for a Signal Block Taken from Two Adjacent Blocks", *IEEE Transactions on Signal Processing*, Vol. 39, No. 7, July 1991, pp. 1692–1695, and Weidong Kou and Tore Fjällbrant in "Fast Computation of Transform Coefficients for a Subadjacent Block for a Transform Family", *IEEE Transactions on Signal Processing*, Vol. 39, No. 7, July 1991, pp. 1695–1699, present in the first article a method for direct computation of DCT coefficients of a one-dimensional signal block composed of halves of two adjacent signal blocks from the DCT coefficients of the two original blocks. The key mechanism in this approach is the use of matrix factorization/matrix algebra. The result is a method which (for a 1×8 signal block) requires 60 multiplications and 68 additions, whereas the worst case of the method according to the present invention applied to a shift over 4 requires 40 multiplications and 60 additions.

The method of the present invention gives the best known results for the shift over 4 pixels. It also gives the best known results for merges with 4 pixels from each block. Moreover, it excels in that it is just as easy to derive the algorithm for arbitrary signal blocks formed from a samples of one block and 8−σ samples from the adjacent block as it is for "½ of one and ½ of the other". Compare this with the algorithm described in the words of the authors (paraphrased) yields complex derivations when attempting to extend to any case other than "½ and ½". Neither article teaches including the de-quantization in their equations nor the method to obtain the solutions taught in this invention.

SUMMARY OF THE INVENTION

It is therefore an object of the present invention to provide transform domain processing to shift and/or merge transformed data which increases the speed of processing of color images by color printers.

According to the invention, a two-dimensional algorithm performs the merging of complementary portions from two independent overlapped images on the same 8×8 grid without the computational expense of conversion to and from the real domain. The merging parameters on the horizontal and vertical axes are independent. Due to the fact that non-zero DCT coefficients are generally sparse, this algorithm lends itself nicely to the development of special cases which are even faster.

The algorithm according to the present invention meets these criterion as well as:

1) Providing for faster and more flexible image processing for the printing industry that is available with current technologies. As an example, consider that JPEG images are often padded on the right and bottom when the image of interest has pixel dimensions which are not multiples of eight. If this image is rotated by ninety degrees, the padded areas suddenly take on new precedence as the top or left side of the image. By quickly performing one-dimensional shifts of the image border in each of the two dimensions via the method of this invention, the boundaries of the image are redefined and quality is restored.

2) Eliminating errors which routinely take place when working in the real domain with fixed precision computation by avoiding the real domain entirely. See, U.S. patent applications Ser. Nos. 09/186,245, 09/186,249, and 09/186,247, cited above.

BRIEF DESCRIPTION OF THE DRAWINGS

The foregoing and other objects, aspects and advantages will be better understood from the following detailed description of a preferred embodiment of the invention with reference to the drawings, in which:

FIG. 11 is a function blockfrom the flow diagram of FIGS. 10A and 10B showing another calculation of $a_{ij}$ and $b_{ij}$ incorporating only the de-quantization;

FIG. 12 is a function block from the flow diagram of FIGS. 10A and 10B showing another calculation of $a_{ij}$ and $b_{ij}$ incorporating only the re-quantization;

FIG. 13 is a function block from the flow diagram of FIGS. 10A and 10B showing $a_{ij}$ and $b_{ij}$ being set equal to $a_{ij}'$ and $b_{ij}'$ because no quantization is incorporated into the equations;

DETAILED DESCRIPTION OF PREFERRED EMBODIMENTS OF THE INVENTION

Figure 1:
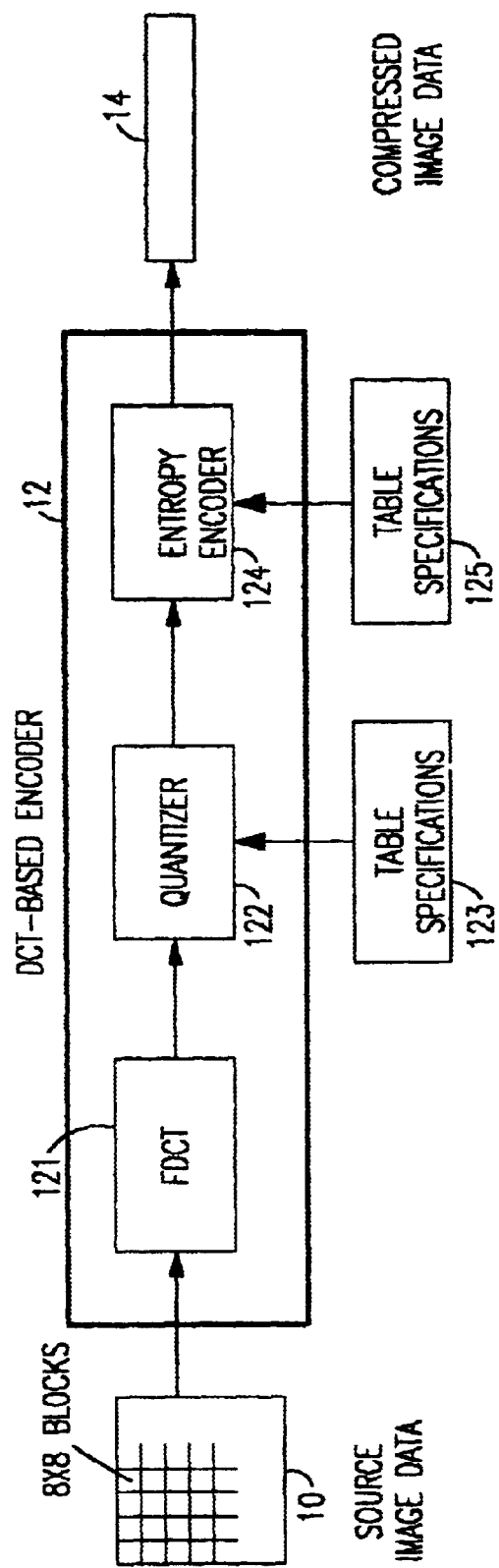
FIG. 1 is a simplified block diagram of a DCT-based JPEG encoder.

The purpose of image compression is to represent images with less data in order to save storage costs or transmission time and costs. The most effective compression is achieved by approximating the original image, rather than reproducing it exactly. The JPEG standard allows the interchange of images between diverse applications and opens up the capability to provide digital continuous-tone color images in multi-media applications. JPEG is primarily concerned with images that have two spatial dimensions, contain grayscale or color information, and possess no temporal dependence, as distinguished from the MPEG (Moving Pictures Experts Group) standard. The amount of data in a digital image can be extremely large, sometimes being millions of bytes. JPEG compression can reduce the storage requirements by more than an order of magnitude and improve system response time in the process. Although the preferred embodiment uses JPEG compressed data, it will be understood by those skilled in the art that the principles of the invention can be applied to MPEG compressed data or data compressed by other compression techniques, including scientific data.

One of the basic building blocks for JPEG is the Discrete Cosine Transform (DCT). An important aspect of this transform is that it produces uncorrelated coefficients. Decorrelation of the coefficients is very important for compression because each coefficient can be treated independently without loss of compression efficiency. Another important aspect of the DCT is the ability to quantize the DCT coefficients using visually-weighted quantization values. Since the human visual system response is very dependent on spatial frequency, by decomposing an image into a set of waveforms, each with a particular spatial frequency, it is possible to separate the image structure the eye can see from the structure that is imperceptible. The DCT provides a good approximation to this decomposition.

The two basic components of an image compression system are the encoder and the decoder. The encoder compresses the "source" image (the original digital image) and provides a compressed data (or coded data) output. The compressed data may be either stored or transmitted, but at some point are fed to the decoder. The decoder recreates or "reconstructs" an image from the compressed data. In general, a data compression encoding system can be broken into three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data. The encoder may require external tables; that is, tables specified externally when the encoder is invoked. Generally, there are two classes of tables; model tables that are needed in the procedures that generate the descriptors and entropy-coding tables that are needed by the JPEG entropy-coding procedures. JPEG uses two techniques for entropy encoding: Huffman coding and arithmetic coding. Similarly to the encoder, the decoder can be broken into basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect ratio, pixel shape, orientation of image, etc. Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the function of the segment. For more information the JPEG standard, see W. B. Pennebaker and J. L. Mitchell, *JPEG Still Image Data Compression Standard*, Van Nostrand Reinhold (1993).

Referring now to the drawings, and more particularly to FIG. 1, there is shown a simplified block diagram of a DCT-based encoder. A source image 10 sampled data in 8×8 blocks are input to the encoder 12. Each 8×8 block is transformed by the Forward Discrete Cosine Transform (FDCT) 121 into a set of 64 values, referred to as the DCT coefficients. One of these values is referred to as the DC coefficient, and the other 63 values are referred to as AC coefficients. Each of the 64 coefficients are then quantized by quantizer 122 using one of 64 corresponding values from a quantization table 123. The quantized coefficients are then passed to an entropy encoding procedure 124 using table specifications 125. This procedure compresses the data further. One of two entropy encoding procedures can be used, Huffman encoding or arithmetic encoding. If Huffman encoding is used, then Huffman table specifications must be provided, but if arithmetic encoding is used, then arithmetic coding conditioning table specifications must be provided. The previous quantized DC coefficient is used to predict the current DC coefficient and the difference is encoded. The 63 AC coefficients, however, are not differentially encoded but, rather, are converted into a zig-zag sequence. The output of the entropy encoder is the compressed image data 14.

Figure 2:
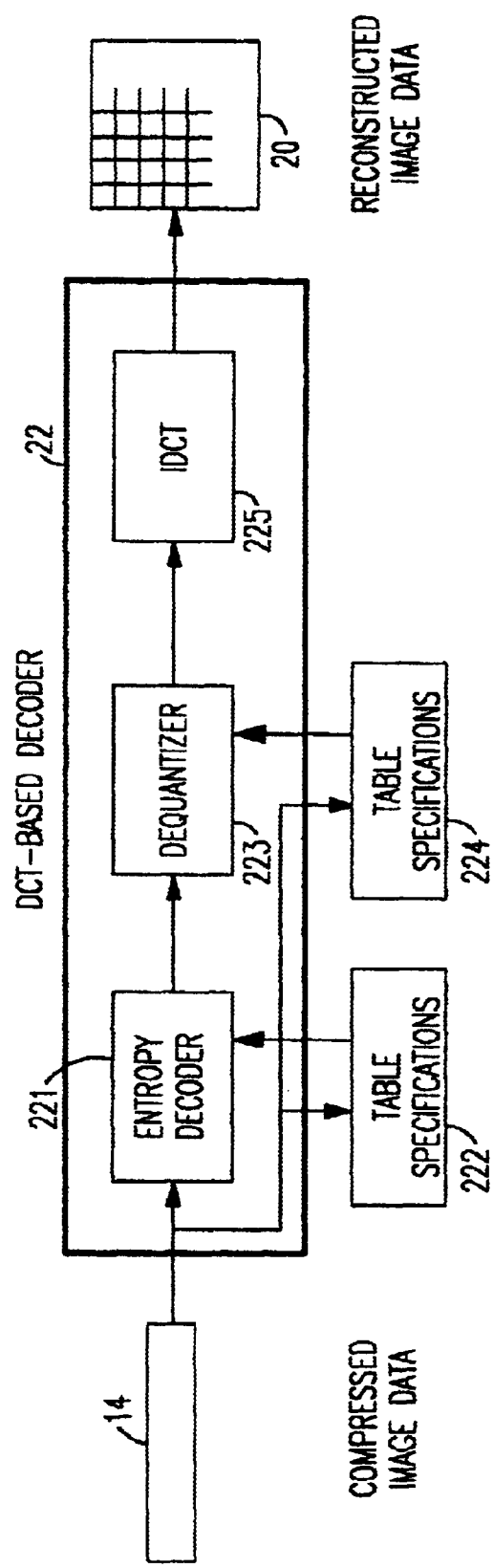
FIG. 2 is a simplified block diagram of a DCT-based JPEG decoder.

FIG. 2 shows a simplified block diagram of the DCT-based decoder. Each step shown performs essentially the inverse of its corresponding main procedure within the encoder shown in FIG. 1. The compressed image data 14 is input to the decoder 22 where it is first processed by an entropy decoder procedure 221 which decodes the zig-zag sequence of the quantized DCT coefficients. This is done using either Huffman table specifications or arithmetic coding conditioning table specifications 222, depending on the coding used in the encoder. The quantized DCT coefficients output from the entropy decoder are input to the dequantizer 223 which, using quantization table specifications 224, outputs dequantized DCT coefficients to Inverse Discrete Cosine Transform (IDCT) 225. The output of the IDCT 225 is the reconstructed image 20.

Figure 3:
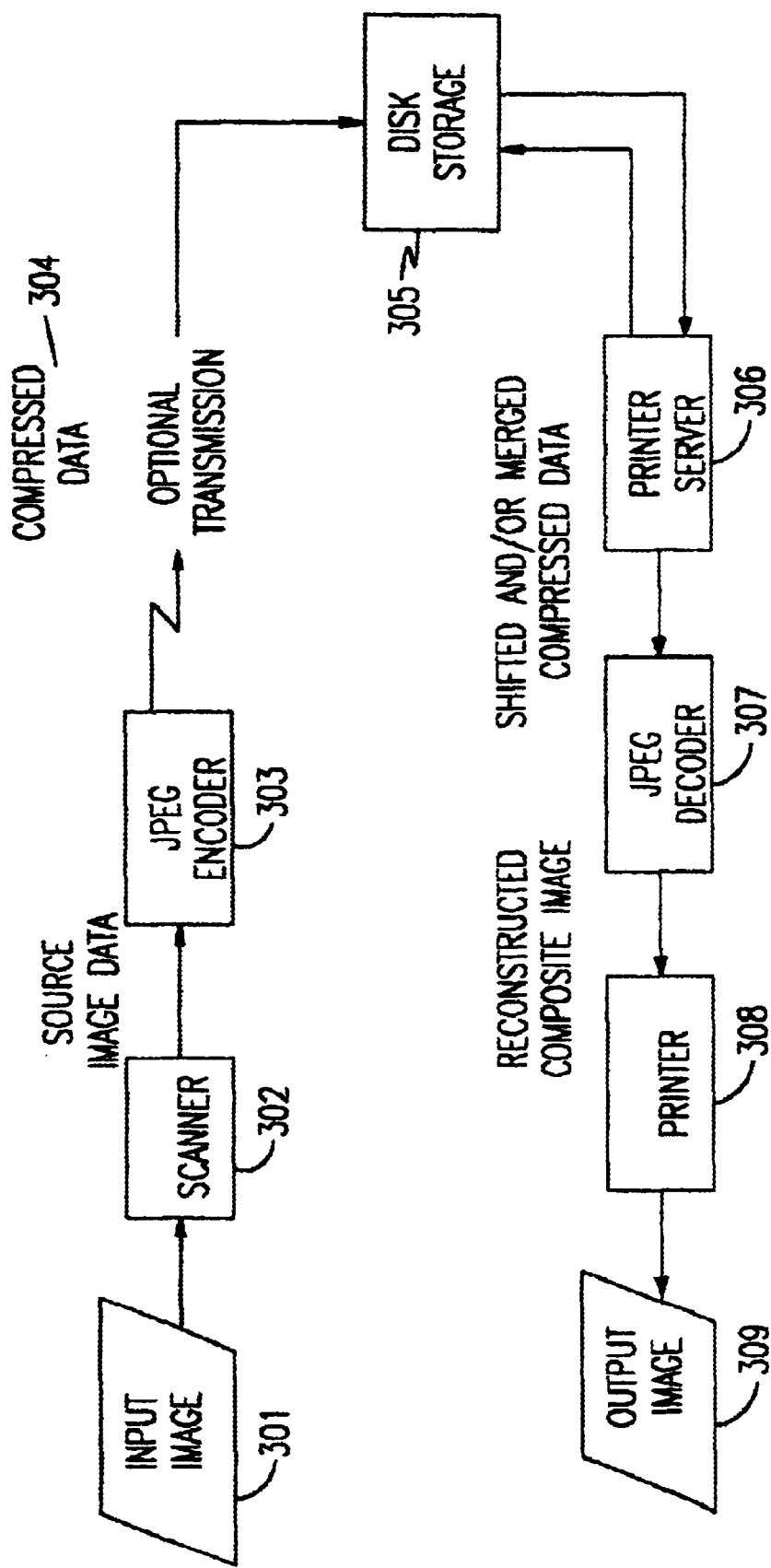
FIG. 3 is a block diagram of a simple printing system that uses JPEG compressed images.

FIG. 3 shows a block diagram of a simple printing system that uses JPEG compressed images. For this illustration, the input image is assumed to be a grayscale image and the printer, a grayscale printer. The input image 301 is scanned in the scanner 302 and then the source image data, a single component of gray, is compressed with a JPEG encoder 303, such as described with reference to FIG. 1. The JPEG encoder 303 is shown separate from the scanner 302, but in a practical embodiment, the JPEG encoder 303 could be incorporated with the scanner 302. The output of the JPEG encoder 303 is compressed data 304. After optional transmission, the compressed data is stored on a disk storage device 305. At some later time, the compressed data stored on the disk storage device 305 is retrieved by the printer server 306 which composes a composite image. The composite image is recompressed in the printer server 306 so that the JPEG decoder 307 decodes the composite image. The JPEG decoder 307 is as described with reference to FIG. 2. The printer 308 prints the grayscale composite image and produces the output image 309 on paper.

Figure 4:
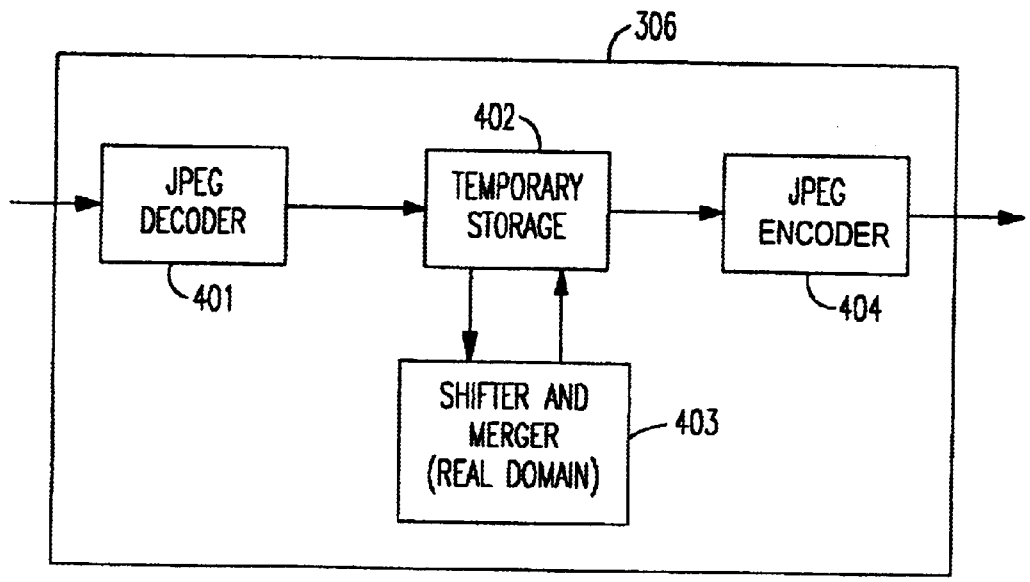
FIG. 4 is a block diagram showing in more detail a conventional printer server of the printing system of FIG. 3.

FIG. 4 shows in more detail a traditional printer server 306. The compressed images are JPEG decoded by JPEG decoder 401 and stored temporarily in temporary storage 402 as 8-bit/sample values. The composite image is created in the real domain by the shifter and merger 403 and stored in temporary storage 402. Then the composite image is encoded with the JPEG encoder 404. The JPEG decoder 401 and the JPEG encoder 404 are, again, like that shown in FIGS. 2 and 1, respectively. All of the blocks including the shifter and merger 403 in the real domain could be programs running in a processor, such as a RISC (Reduced Instruction Set Computer) processor, and example of which is the IBM PowerPC® processor. The point here is that the traditional printer server 306 performs the shift and merge operations in the real domain.

Figure 5:
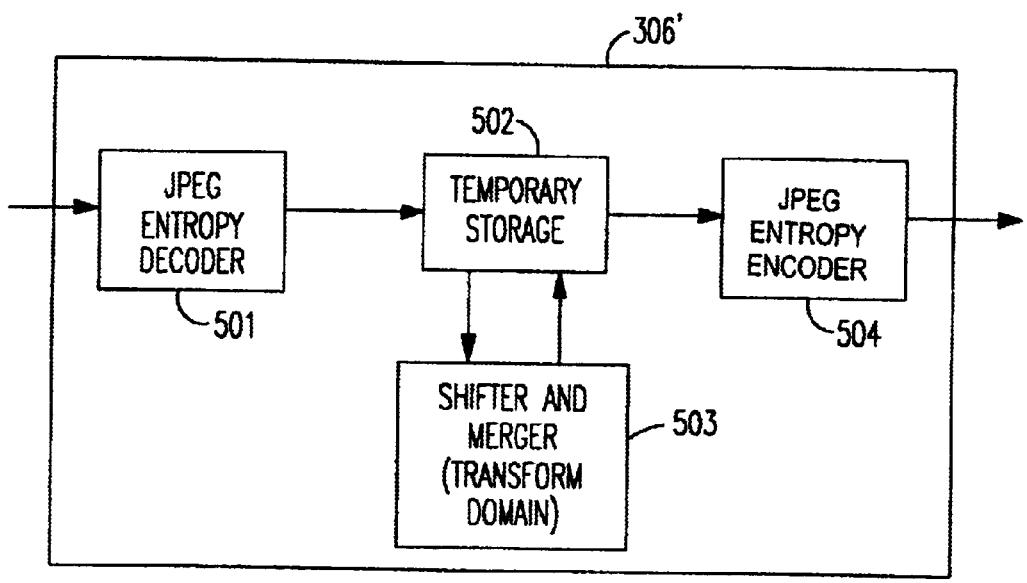
FIG. 5 is a block diagram showing an improved printer server realized by incorporating the principles of the present invention.

FIG. 5 shows the application of the present invention making a faster printer server 306'. The compressed images are JPEG entropy decoded in JPEG entropy decoder 501, and the quantized DCT coefficients are stored in temporary storage 502. The composite image is created by the two-dimensional shifter and merger 503 using transform domain processing, in contrast to real domain processing. Then the DCT coefficients of the composite image are JPEG entropy encoded in JPEG entropy encoder 504. This greatly increases the speed of processing in, for this specific example, high speed printers.

The example of this single gray component can be extended to color by those familiar with color printing. Color images are traditionally printed in Cyan, Magenta, Yellow and blacK (CMYK) toner or ink. High speed printers can have dedicated hardware for each component to decode independent JPEG images. Lower speed printers may take Red, Green and Blue (RGB) images and do the color conversion internally to the printer. In either case, the JPEG blocks are composed of only one component.

Merge Operators in the DCT Domain

We begin by describing the operators in the DCT domain induced by the merge (and shift) operators on the picture domain. The discussion deals with one-dimensional merges (and shifts); i.e., shifts and/or merges along one axis. For illustrative purposes, the number of samples in a block, N, is chosen to be 8.

In the case of a one-dimensional shift of an image's blocks, two adjacent, non-overlapping blocks are used. The new block's real-domain samples come from the σ right-most samples of the left block and the 8−σ left-most samples of the right block for a horizontal shift. We could characterize this as the RIGHT samples from the first block are being merged with the LEFT samples of the second block to create the new block. For a vertical shift, the bottom-most σ samples of the top block are combined with the top-most 8−σ samples of the bottom block. this is just a rotation of the horizontal case and uses the same equations. Since the adjacent blocks are from the same image, the quantization is guaranteed to be the same for both blocks.

The situation for creating a composite image from two images is more complex. For example, assuming that the blocks for the two images are already aligned, then for a one-dimensional merge, we select the blocks from the first image until reaching the block that is partially composed from both images. For blocks containing the left edge of the second image, the first σ samples from the left-most samples in the first image's block and the right-most 8−σ samples from the second image's overlapping block are used to create the merged block. Then the blocks from the second image are selected until reaching the right edge of the second image. There the merged blocks are composed from the left-most σ samples from the second image's block and the right-most 8−σ samples from the first image's block. The quantization may or may not be the same for both images.

The situation for creating a composite image by merging two images along one axis when the two images are not on the same grid is even more complex. There are 147 combinations of extracting σ contiguous samples from one block and extracting another 8−σ contiguous samples from another arbitrarily overlapping block to create a new merged block. Table 1 shows 149 different combinations including the trivial complete blocks. Table 2 shows the simplification that comes from first aligning the blocks.

TABLE 1

Combinations of Samples Extracted from Two Arbitrarily Overlapping Blocks

| Number of Samples | | First Sample Position | | Number of |
|---|---|---|---|---|
| σ | 8−σ | block 1 | block 2 | Combinations |
| 0 | 8 | — | 0 | 1 |
| 1 | 7 | 0,1,2,3,4,5,6,7 | 0,1 | 16 |
| 2 | 6 | 0,1,2,3,4,5,6 | 0,1,2 | 21 |
| 3 | 5 | 0,1,2,3,4,5 | 0,1,2,3 | 24 |
| 4 | 4 | 0,1,2,3,4 | 0,1,2,3,4 | 25 |
| 5 | 3 | 0,1,2,3 | 0,1,2,3,4,5 | 24 |
| 6 | 2 | 0,1,2 | 0,1,2,3,4,5,6 | 21 |
| 7 | 1 | 0,1 | 0,1,2,3,4,5,6,7 | 16 |
| 8 | 0 | 0 | — | 1 |

TABLE 2

Combinations of Samples Extracted from Two Aligned Blocks

| Number of Samples | | First Sample Position | | Number of |
|---|---|---|---|---|
| σ | 8−σ | block 1 | block 2 | Combinations |
| 0 | 8 | — | 0 | 1 |
| 1 | 7 | 0 | 1 | 1 |
| 2 | 6 | 0 | 2 | 1 |
| 3 | 5 | 0 | 3 | 1 |
| 4 | 4 | 0 | 4 | 1 |
| 5 | 3 | 0 | 5 | 1 |
| 6 | 2 | 0 | 6 | 1 |
| 7 | 1 | 0 | 7 | 1 |
| 8 | 0 | 0 | — | 1 |

If the blocks are not pre-aligned, the samples from each image might be split across two blocks. So even assuming vertical alignment, it is possible to need three (or four blocks) to create the composite block. Our invention works for all cases, but due to the excessive number of solutions required, we recommend pre-aligning the blocks using the shift within a single image before merging to create the composite image.

Since the second image is being shifted to align it, the shift of the edge blocks can be chosen to be different than the internal shift to align with the final grid. For example, the desired left edge of the second image could always be aligned on a block boundary. Then the left samples of the first image block are merged with the left samples of the second image's block. On the other edge, the second image's right edge blocks could be right-aligned on a block boundary. Then the right-most samples from the second block are merged with the right-most samples from the first image's block.

There are four most significant cases to be distinguished, one of them also corresponding to the shift operator.

Let $D: \mathfrak{R}^8 \to \mathfrak{R}^8$ be the DCT, given by $$D_{ux} = C_u \cos\left(\frac{\pi}{16}u(2x+1)\right), \quad u, x = 0, 1, \ldots, 7$$

where $$C_u = \begin{cases} \frac{1}{2\sqrt{2}} & \text{if } u = 0 \\ \frac{1}{2} & \text{otherwise} \end{cases}$$

This matrix is orthogonal and so the inverse of the matrix, $D^{-1}$, is equal to its transpose, $D^T$. The input domain of D is called the sampled domain, which could be a picture, for example, and the output is said to be in the DCT-domain. The points in the DCT-domain are denoted by capitals with tildes on top; e.g., $\tilde{F}, \tilde{G}, \tilde{H}$.

Figure 6:
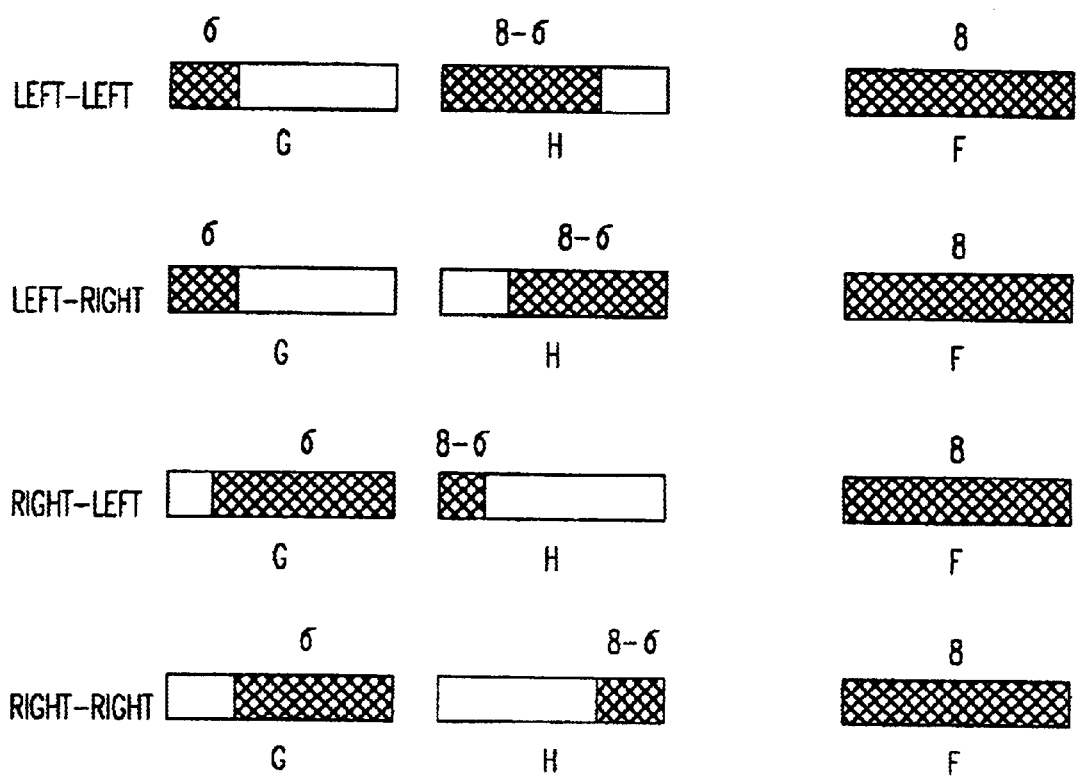
FIG. 6 is a diagram showing four types of merge operators.

There are four significant types of Merge operators, M: $\mathfrak{R}^8 \times \mathfrak{R}^8 \to \mathfrak{R}^8$. In each case, there is an integer, σ=0, 1, . . . , 8, which will indicate that σ entries are taken from the left vector and 8−σ elements are taken from the second vector. In particular, the merge operators will either concatenate the left or right σ elements of the left vector with the left or right 8−σ elements of the second vector. This gives rise to four distinct merge operators acting on the DCT-domains M: $\mathfrak{R}^8 \times \mathfrak{R}^8 \to \mathfrak{R}^8$. These are shown in FIG. 6 as left-left, left-right, right-left, and right-right.

Left-Left

Let G, H∈$\mathfrak{R}^8$ be vectors in the picture. We are going to introduce the notation needed to describe the merge operator $M_{ll}$ which concatenates the left σ elements of G with the left 8−σ elements of H. The result is denoted by F. Consider the composite block vector X∈$\mathfrak{R}^{16}$ $$X = \begin{pmatrix} G \\ H \end{pmatrix}$$

and use the block form notation to define the 8×16 matrix $$M_{ll} = (U_\sigma, V_\sigma),$$

where $U_\sigma$ and $V_\sigma$ are 8×8 matrices defined as follows:

$$(U_\sigma)_{xy} = \begin{cases} 1 & \text{if } x = y = 0, 1, \ldots, \sigma-1 \\ 0 & \text{otherwise} \end{cases}$$

and $$(V_\sigma)_{xy} = \begin{cases} 1 & \text{if } y = 0, 1, \ldots, 7-\sigma, x = \sigma + y \\ 0 & \text{otherwise} \end{cases}$$

Now $F = M_{ll} X$. In particular, $$F = U_\sigma G + V_\sigma H.$$

Let $\tilde{G} = DG$, $\tilde{H} = DH$ and $\tilde{F} = DF$. Then $$\tilde{F} = DU_\sigma D^T \tilde{G} + DV_\sigma D^T \tilde{H}.$$

We introduce the 8×8 matrices $$\tilde{U}_\sigma = DU_\sigma D^T$$

and $$\tilde{V}_\sigma = D(V_{8-\sigma})^T D^T.$$

Thus, we have for u, v=0, 1, ..., 7

$$(U_\sigma)_{uv} = \sum_{m=0}^{\sigma-1} D_{um} D_{vm}$$

and $$(V_\sigma)_{uv} = \sum_{m=0}^{\sigma-1} D_{um} D_{v,8-\sigma+m}.$$

Using this notation, we get the following expression for the merge operator acting in the DCT domain:

$$M_{ll} = (U_\sigma, V_{8-\sigma}^T)$$

or $$\tilde{F} = U_\sigma \tilde{G} + V_{8-\sigma}^T \tilde{H}.$$

Left-Right

Let G, H∈$\Re^8$ be again vectors in the picture. We are going to describe the merge operator $M_{lr}$ which concatenates the left σ elements of G with the right 8−σ elements of H. The result is denoted by F. Let X∈$\Re^{16}$ be the composite block vector of G and H and use the block form to define the 8×16 matrix $$M_{lr} = (U_\sigma, (I-U_\sigma)),$$

where I is the identity matrix of size 8×8. Then F=$M_{lr}$X or $$F = U_\sigma G + (I-U_\sigma) H.$$

Let $\tilde{G}$=DG, $\tilde{H}$=DH and $\tilde{F}$=DF. Then we get the following expression for the action of the merge operator in the DCT domain, $M_{lr}$=($U_\sigma$,(I−$U_\sigma$)) or $$\tilde{F} = U_\sigma \tilde{G} + (I-U_\sigma) \tilde{H}.$$

Right-Left

Let G, H∈$\Re^8$ be again vectors in the picture. We are going to describe the merge operator $M_{rl}$ which concatenates the right σ elements of G with the left 8−σ elements of H. The result is denoted by F. Let X∈$\Re^{16}$ be the composite block vector of G and H and use the block form to define the 8×16 matrix $$M_{rl} = ((V_{8-\sigma})^T, V_\sigma).$$

Then F=$M_{rl}$X or $$F = (V_{8-\sigma})^T G + V_\sigma H.$$

Let $\tilde{G}$=DG, $\tilde{H}$=DH and $\tilde{F}$=DF. Then we get the following expression for the action of the merge operator in the DCT domain, $M_{rl}$=($V_\sigma$, $V_{8-\sigma}^T$) or $$\tilde{F} = V_\sigma \tilde{G} + V_{8-\sigma}^T \tilde{H}.$$

Right-Right

Let G, H∈$\Re^8$ be again vectors in the picture. We are going to describe the merge operator $M_{rr}$ which concatenates the right σ elements of G with the right 8−σ elements of H. The result is denoted by F. Let X∈$\Re^{16}$ be the composite block vector of G and H and use the block form to define the 8×16 matrix $$M_{rr} = ((V_{8-\sigma})^T, I-U_\sigma).$$

Then F=$M_{rr}$X or $$F = (V_{8-\sigma})^T G + (I-U_\sigma) H.$$

Let $\tilde{G}$=DG, $\tilde{H}$=DH and $\tilde{F}$=DF. Then we get the following expression for the action of the merge operator in the DCT domain, $M_{rr}$=($V_\sigma$, I−$U_\sigma$) or $$\tilde{F} = V_\sigma \tilde{G} + (I-U_\sigma) \tilde{H}.$$

Improved Merge Operators in the DCT Domain

Instead of working directly with the input $$X = \begin{pmatrix} G \\ H \end{pmatrix}$$

we will do the actual computation of $\tilde{F}$=MX, where M is a merge operator in the DCT domain, using the block vector of sums and differences $$\begin{pmatrix} \tilde{S} \\ \tilde{D} \end{pmatrix} = \begin{pmatrix} \tilde{G} + \tilde{H} \\ \tilde{G} - \tilde{H} \end{pmatrix}.$$

This change of coordinates will have the consequence that the matrices involved will have many entries equal to zero. In particular, if the merge operator has the block form $$M = (A B),$$

then the computation of $\tilde{F}$ in terms of $\tilde{S}$ and $\tilde{D}$ results in $$\tilde{F} = \frac{1}{2}(A+B \quad A-B)\begin{pmatrix} \tilde{S} \\ \tilde{D} \end{pmatrix}.$$

The process is illustrated by four examples, two examples with the most improvement and two examples with the least improvement of the computation.

EXAMPLE 1

4-Shift or Right-Left Merge, σ=4

The shift over four elements results in the following matrix. The entries are order coded. That is, $C_1$ represents the entry of largest magnitude, and $C_{19}$ the entry with the smallest magnitude. The actual values are presented in Table 3. Observe that seventy-six entries out of one hundred twenty-eight are zero.

$$\tilde{F} = \begin{pmatrix} 1 & 0 & 0 & 0 & 0 & 0 & 0 & 0 \\ 0 & -6 & 0 & 6 & 0 & -14 & 0 & 14 \\ 0 & 0 & -1 & 0 & 0 & 0 & 0 & 0 \\ 0 & 6 & 0 & 14 & 0 & -6 & 0 & 14 \\ 0 & 0 & 0 & 0 & 1 & 0 & 0 & 0 \\ 0 & -14 & 0 & -6 & 0 & -14 & 0 & 6 \\ 0 & 0 & 0 & 0 & 0 & 0 & -1 & 0 \\ 0 & 14 & 0 & 14 & 0 & 6 & 0 & 6 \end{pmatrix} \tilde{S} +$$

$$\tilde{D} = \begin{pmatrix} 0 & -2 & 0 & 12 & 0 & -15 & 0 & 16 \\ 2 & 0 & -9 & 0 & -18 & 0 & -19 & 0 \\ 0 & 9 & 0 & 4 & 0 & -11 & 0 & 13 \\ -12 & 0 & -4 & 0 & 7 & 0 & 17 & 0 \\ 0 & 18 & 0 & -7 & 0 & -5 & 0 & 10 \\ 15 & 0 & 11 & 0 & 5 & 0 & -8 & 0 \\ 0 & 19 & 0 & -17 & 0 & 8 & 0 & 3 \\ -16 & 0 & -13 & 0 & -10 & 0 & -3 & 0 \end{pmatrix}$$

TABLE 3

Constants for the 4-Shift

| i | $C_i$ | i | $C_i$ | i | $C_i$ |
|---|---|---|---|---|---|
| 1 | 0.5000000000 | 8 | 0.2451963201 | 15 | 0.10630376190 |
| 2 | 0.4530637231 | 9 | 0.2078674031 | 16 | 0.09011997765 |
| 3 | 0.4328614588 | 10 | 0.1876651387 | 17 | 0.04877258047 |
| 4 | 0.3955325418 | 11 | 0.1762214752 | 18 | 0.03732891705 |
| 5 | 0.3840888783 | 12 | 0.1590948225 | 19 | 0.01144366360 |
| 6 | 0.3266407412 | 13 | 0.1388925582 | | |
| 7 | 0.2566399836 | 14 | 0.1352990250 | | |

EXAMPLE 2

1-Shift or Right-Left Merge, σ=1

The shift over one bit results in the following matrix. The entries are order coded. That is, one represents the entry of largest magnitude and forty-five the entry with smallest magnitude. The actual values are listed in Table 4.

$$\tilde{F} = \begin{pmatrix} 1 & 0 & 0 & 0 & 0 & 0 & 0 & 0 \\ 0 & 16 & -10 & -17 & -19 & -26 & -30 & -36 \\ 0 & 10 & 9 & -20 & 0 & -40 & 0 & -44 \\ 0 & -17 & 20 & 42 & -5 & -29 & -28 & -38 \\ 0 & -19 & 0 & 5 & 0 & 13 & 0 & 39 \\ 0 & -26 & -40 & -29 & -13 & -12 & 11 & -41 \\ 0 & -30 & 0 & -28 & 0 & -11 & -9 & 24 \\ 0 & -36 & -44 & -38 & -39 & -41 & -24 & -2 \end{pmatrix} \tilde{S} +$$

$$\begin{pmatrix} 6 & -20 & -22 & -24 & -27 & -30 & -34 & -40 \\ 20 & 3 & -32 & 0 & -43 & 0 & -45 & 0 \\ -22 & 32 & 25 & -7 & -22 & -23 & -31 & -35 \\ 24 & 0 & 7 & 18 & -14 & 0 & -37 & 0 \\ 27 & 43 & 22 & 14 & 27 & -8 & 34 & -33 \\ 30 & 0 & 23 & 0 & 8 & 18 & -15 & 0 \\ 34 & 45 & 31 & 37 & 34 & 15 & 4 & -21 \\ 40 & 0 & 35 & 0 & 33 & 0 & 21 & 3 \end{pmatrix} \tilde{D}$$

TABLE 4

Constants for the 1-Shift

| i | $C_i$ | i | $C_i$ | i | $C_i$ |
|---|---|---|---|---|---|
| 1 | 0.5000000000 | 16 | 0.2214548247 | 31 | 0.08838834761 |
| 2 | 0.4714548247 | 17 | 0.2038732892 | 32 | 0.07954741119 |
| 3 | 0.4619397663 | 18 | 0.1913417163 | 33 | 0.07181633950 |
| 4 | 0.3901650430 | 19 | 0.1876651388 | 34 | 0.06764951250 |
| 5 | 0.3840888783 | 20 | 0.1733799806 | 35 | 0.05315188091 |
| 6 | 0.3750000000 | 21 | 0.1656489089 | 36 | 0.04783542906 |
| 7 | 0.3654244198 | 22 | 0.1633203706 | 37 | 0.04505998883 |
| 8 | 0.3548518533 | 23 | 0.1628074143 | 38 | 0.04055291710 |
| 9 | 0.3635533907 | 24 | 0.1469844503 | 39 | 0.03732891857 |
| 10 | 0.3060792729 | 25 | 0.1401650430 | 40 | 0.03448742240 |
| 11 | 0.2796837425 | 26 | 0.1362237767 | 41 | 0.02709659397 |
| 12 | 0.2685062872 | 27 | 0.1250000000 | 42 | 0.01850628720 |
| 13 | 0.2566399836 | 28 | 0.1246074001 | 43 | 0.01428515815 |
| 14 | 0.2371044280 | 29 | 0.1154849416 | 44 | 0.00809189203 |
| 15 | 0.2265318616 | 30 | 0.09821186975 | 45 | 0.00437930050 |

EXAMPLE 3

Left-Right Merge, σ=4

The Left-Right merge, σ=4, results in the following matrix. The entries are order coded. That is, one represents the entry of largest magnitude, and seventeen the entry with the smallest magnitude. Their values are given in Table 5. Observe that eighty-eight entries of one hundred twenty-eight are zero.

$$\tilde{F} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \tilde{S} +$$

$$\begin{pmatrix} 0 & 2 & 0 & -11 & 0 & 13 & 0 & -14 \\ 2 & 0 & 8 & 0 & -16 & 0 & 17 & 0 \\ 0 & 8 & 0 & 4 & 0 & -10 & 0 & 12 \\ -11 & 0 & 4 & 0 & 6 & 0 & -15 & 0 \\ 0 & -16 & 0 & 6 & 0 & 5 & 0 & -9 \\ 13 & 0 & -10 & 0 & 5 & 0 & 7 & 0 \\ 0 & 17 & 0 & -15 & 0 & 7 & 0 & 3 \\ -14 & 0 & 12 & 0 & -9 & 0 & 3 & 0 \end{pmatrix} \tilde{D}$$

TABLE 5

Constants for the Left-Right Merge with σ = 4

| i | $C_i$ | i | $C_i$ | i | $C_i$ |
|---|---|---|---|---|---|
| 1 | 0.5000000000 | 7 | 0.2451963201 | 13 | 0.10630376190 |
| 2 | 0.4530637231 | 8 | 0.2078674031 | 14 | 0.09011997765 |
| 3 | 0.4328614588 | 9 | 0.1876651387 | 15 | 0.04877258047 |
| 4 | 0.3955325418 | 10 | 0.1762214752 | 16 | 0.03732891705 |
| 5 | 0.3840888783 | 11 | 0.1590948225 | 17 | 0.01144366360 |
| 6 | 0.2566399836 | 12 | 0.1388925582 | | |

EXAMPLE 4

Left-Right Merge, σ=1

The Left-Right merge with σ=1 results in the following matrix. The entries are order coded. That is, one represents the entry of largest magnitude, and thirty-one, the entry with the smallest magnitude. The actual values are given in Table 6.

$$\tilde{F} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \tilde{S} + \begin{pmatrix} -5 & 13 & 14 & 15 & 18 & 20 & 24 & 29 \\ 13 & -8 & 9 & 10 & 13 & 16 & 21 & 26 \\ 14 & 9 & -7 & 11 & 14 & 17 & 22 & 27 \\ 15 & 10 & 11 & -6 & 15 & 19 & 23 & 28 \\ 18 & 13 & 14 & 15 & -5 & 20 & 24 & 29 \\ 20 & 16 & 17 & 19 & 20 & -4 & 25 & 30 \\ 24 & 21 & 22 & 23 & 24 & 25 & -3 & 31 \\ 29 & 26 & 27 & 28 & 29 & 30 & 31 & -2 \end{pmatrix} \tilde{D}$$

TABLE 6

Constants for the Left-Right Merge with $\sigma = 1$

| i | $C_i$ | i | $C_i$ | i | $C_i$ |
|---|---|---|---|---|---|
| 1 | 0.5000000000 | 12 | 0.1866445851 | 23 | 0.07954741131 |
| 2 | 0.4904849416 | 13 | 0.1733799806 | 24 | 0.06764951250 |
| 3 | 0.4633883476 | 14 | 0.1633203706 | 25 | 0.05315188093 |
| 4 | 0.4228354291 | 15 | 0.1469844503 | 26 | 0.04783542906 |
| 5 | 0.3750000000 | 16 | 0.1362237767 | 27 | 0.04505998888 |
| 6 | 0.3271645709 | 17 | 0.1238199918 | 28 | 0.04055291857 |
| 7 | 0.2866116524 | 18 | 0.1250000000 | 29 | 0.03448742240 |
| 8 | 0.2595150584 | 19 | 0.1154859516 | 30 | 0.02709659397 |
| 9 | 0.2265318616 | 20 | 0.09821186975 | 31 | 0.01866445851 |
| 10 | 0.2038732892 | 21 | 0.09383256941 | | |
| 11 | 0.1920444391 | 22 | 0.08838834769 | | |

The following Lemma is useful when coding the corresponding algorithms.

Lemma 1

Let $\tilde{F}_\sigma = A_\sigma \tilde{S} + B_\sigma \tilde{D}$ be a Left-Right or Right-Left merge. Then $$|A_{8-\sigma}| = |A_\sigma| \text{ and}$$

$$|B_{8-\sigma}| = |B_\sigma|.$$

Quantization

The invention further involves the incorporation of the de-quantization and re-quantization into the matrices. The two-dimensional discussion is presented below. First, we consider a one-dimensional merge operator $$\tilde{F} = (A \ B) \begin{pmatrix} \tilde{S} \\ \tilde{D} \end{pmatrix},$$

where $$\begin{pmatrix} \tilde{S} \\ \tilde{D} \end{pmatrix} = \begin{pmatrix} \tilde{G} + \tilde{H} \\ \tilde{G} - \tilde{H} \end{pmatrix}.$$

Observe, if the quantization is the same for both vectors $\tilde{G}$ and $\tilde{H}$, the de-quantization of the sum (or difference) is the sum (or difference) of the de-quantizations $$Q\tilde{G} \pm Q\tilde{H} = Q(\tilde{G} \pm \tilde{H}) = Q\tilde{S} \text{ or } Q\tilde{D}.$$

Let $q \in \Re^8$ be a quantization vector and let $Q = \text{diag}(q)$ be the corresponding diagonal matrix. Assume that $\tilde{G}, \tilde{H} \in Z^8$ is input quantized with respect to q, i.e., they are quantized on the same scale. ($Z^8$ refers to the collection of ordered 8-tuples of integers, which is what we have after quantization.) This is not a restriction if we are considering shift operators. In the case of merging of two pictures, we have to quantize them on the same scale before performing the merge for the following improvement to be successful.

Let $\hat{q} \in \Re^8$ be the desired quantization vector for the output and $\hat{Q} = \text{diag}(\hat{q})$ be the corresponding diagonal matrix. An elementary computation of the quantized output leads to $$\tilde{F} = \left[ (\hat{Q}^{-1} A Q \quad \hat{Q}^{-1} B Q) \begin{pmatrix} \tilde{S} \\ \tilde{D} \end{pmatrix} \right],$$

where the square bracket means the integer part, the actual quantization. Let $$\hat{A} = \hat{Q}^{-1} A Q$$

and $$\hat{B} = \hat{Q}^{-1} B Q.$$

Then by incorporating the de-quantization and quantization we get $$\tilde{F} = \left[ (\hat{A} \ \hat{B}) \begin{pmatrix} \tilde{S} \\ \tilde{D} \end{pmatrix} \right].$$

Observe that the matrices $\hat{A}$ and $\hat{B}$ have the same zero entries as the matrices A and B, the matrices Q and $\hat{Q}$ are diagonal. In particular, $$\hat{A}_{uv} = \frac{q_v}{\hat{q}_u} A_{uv}$$

$$\hat{B}_{uv} = \frac{q_v}{\hat{q}_u} B_{uv},$$

the matrices $\hat{A}$ and $\hat{B}$ can be computed once per image at execution time when the input and output quantization matrices are known. The improvement from the sum and differences continue if $\tilde{G}$ and $\tilde{H}$ blocks have the same quantization and will appear together with the improvement just described.

Fast Paths

The third improvement is based on the fact that typical quantized input has the property that only the first one or two entries are non-zero. Assume that only the first $\tau = 1, 2, \ldots, 8$ entries of the input vectors $\tilde{G}$ and $\tilde{H}$ are non-zero. Let $P_\tau: \Re^8 \to \Re^\tau$ be the projection onto the first $\tau$ entries. Observe, that $$P_\tau \tilde{G} \pm P_\tau \tilde{H} = P_\tau (\tilde{G} \pm \tilde{H}) = P_\tau \tilde{S} \text{ or } P_\tau \tilde{D}.$$

Consider the merge operator in the DCT domain $$\tilde{F} = \left[ (\hat{A} \ \hat{B}) \begin{pmatrix} \tilde{S} \\ \tilde{D} \end{pmatrix} \right],$$

with de-quantization and quantization incorporated. Let $\tilde{S}_\tau = P_\tau \tilde{S}$ and $\tilde{D}_\tau = P_\tau \tilde{D}$ be $\tau$-vectors and $\hat{A}_\tau$ and $\hat{B}_\tau$ be the 8×$\tau$ matrices formed by the first $\tau$ columns of respectively $\hat{A}$ and $\hat{B}$. An elementary computation shows $$\tilde{F} = \left[ \begin{pmatrix} \hat{A}_\tau & \hat{B}_\tau \end{pmatrix} \begin{pmatrix} \tilde{S}_\tau \\ \tilde{D}_\tau \end{pmatrix} \right].$$

This improvement is referred to as fast paths. The improvement of the fast paths comes from the fact that the involved matrices are of much smaller size. In the actual implementation, this translates into fewer non-zero entries in the stored shift (or merge) matrices.

Specific Implementation

Assuming that two independent 1×8 image strips G and H lie on the same 1×8 grid, the left σ pels of strip G are merged with the right 8−σ pels of strip H by computing the DCT coefficients for the hybrid strip, yielding DCT coefficients which depend upon a mixture of samples from strips G and H. The inverse transforms for each of the respective samples are then substituted into this formula yielding a transformation form the DCT coefficients of the original strips G and H to DCT coefficients for the new hybrid strip. These equations are then optimized via algebraic and trigonometric symmetries to produce fast code.

Figure 7:
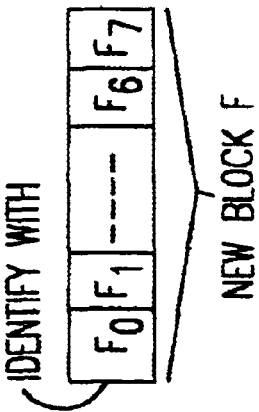
FIG. 7 is a diagram showing two strips, each having eight samples, for illustrating the one-dimensional merge algorithm according to the invention.

To illustrate, consider the two 1×8 data strips shown in FIG. 7. These data strips actually occupy the same 1×8 space, but are shown separately in FIG. 7 for clarity. Let $\tilde{G}_0, \ldots, \tilde{G}_7$ and $\tilde{H}_0, \ldots, \tilde{H}_7$ represent the corresponding DCT coefficients for each strip. The actual samples of each strip can then be expressed in terms of these DCT coefficients as $$G_x = \sum_{u=0}^{7} C_u \tilde{G}_u \cos\left(\frac{(2x+1)\pi u}{16}\right),$$
$$H_x = \sum_{u=0}^{7} C_u \tilde{H}_u \cos\left(\frac{(2x+1)\pi u}{16}\right), \quad \text{for } x = 0, \ldots, 7,$$ (3)

where $$C_u = \frac{1}{2\sqrt{2}} \text{ if } u = 0, \; C_u = 1/2 \text{ if } u > 0.$$

Figure 8:
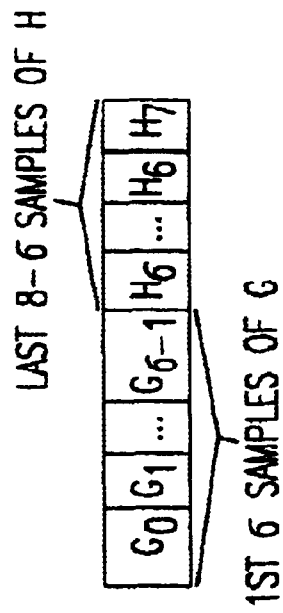
FIG. 8 is a diagram showing the process of merging the two strips to produce a hybrid strip of eight merged samples.

We merge the data strips G and H in the following fashion. Let σ (the merge parameter) be defined as the number of samples taken from strip G (so that 8−σ are taken from strip H). The process is generally illustrated in FIG. 8 which shows the generation of a hybrid strip. Let F$^\sigma$ denote this hybrid strip (where the superscript emphasizes the dependence on merge parameter σ). If we were to compute the forward DCT coefficients for F$^\sigma$, we would obtain $$\tilde{F}_v^\sigma = C_v \sum_{x=0}^{7} F_x^\sigma \cos\left(\frac{(2x+1)\pi v}{16}\right), \quad C_u = \begin{cases} \frac{1}{2\sqrt{2}} & v = 0 \\ \frac{1}{2} & v > 0 \end{cases} \quad v = 0, \ldots, 7$$ (4)

where strip $F_x^\sigma$ can be either strip $G_x$ or strip $H_x$ in the following way, $$F_x^\sigma = \begin{cases} G_x & 0 \leq x < \sigma \\ H_x & \sigma \leq x \leq 7 \end{cases}$$ (5)

As noted earlier, each of strips $G_x$ and $H_x$ can be expressed in terms of frequency components by application of an inverse DCT (see equation (3)). Substitution of these formulas into equation (5) yields the relation:

$$F_x^\sigma = \begin{cases} \sum_{u=0}^{7} C_u \tilde{G}_u \cos\left(\frac{(2x+1)\pi u}{16}\right) & \text{if } 0 \leq x < \sigma \\ \sum_{u=0}^{7} C_u \tilde{H}_u \cos\left(\frac{(2x+1)\pi u}{16}\right) & \text{if } \sigma \leq x \leq 7 \end{cases}$$

which when substituted into equation (4) provides the formula of interest:

$$\tilde{F}_v^\sigma = C_v \sum_{x=0}^{\sigma-1} \left[\sum_{u=0}^{7} C_u \tilde{G}_u \cos\left(\frac{(2x+1)\pi u}{16}\right)\right] \cos\left(\frac{(2x+1)\pi v}{16}\right) + C_v \sum_{x=\sigma}^{7} \left[\sum_{u=0}^{7} C_u \tilde{H}_u \cos\left(\frac{(2x+1)\pi u}{16}\right)\right] \cos\left(\frac{(2x+1)\pi v}{16}\right)$$

or, in a more elegant form $$\tilde{F}_v^\sigma = \sum_{u=0}^{7} C_u C_v \left\{ \left[\sum_{x=0}^{\sigma-1} \cos\left(\frac{(2x+1)\pi u}{16}\right) \cos\left(\frac{(2x+1)\pi v}{16}\right)\right] \tilde{G}_u + \left[\sum_{x=\sigma}^{7} \cos\left(\frac{(2x+1)\pi u}{16}\right) \cos\left(\frac{(2x+1)\pi v}{16}\right)\right] \tilde{H}_u \right\}$$

Thus, given the frequency (DCT) components $\tilde{G}_0, \ldots, \tilde{G}_7$ and $\tilde{H}_0, \ldots, \tilde{H}_7$ of the original two 1×8 strips G and H, we directly acquire DCT components for the hybrid strip F as a linear combination of the original strips G and H DCT coefficients (dependent nonlinearly on the merging parameter σ). The above derivation works identically if the strips were vertical columns 8 high and 1 wide.

Figure 9:
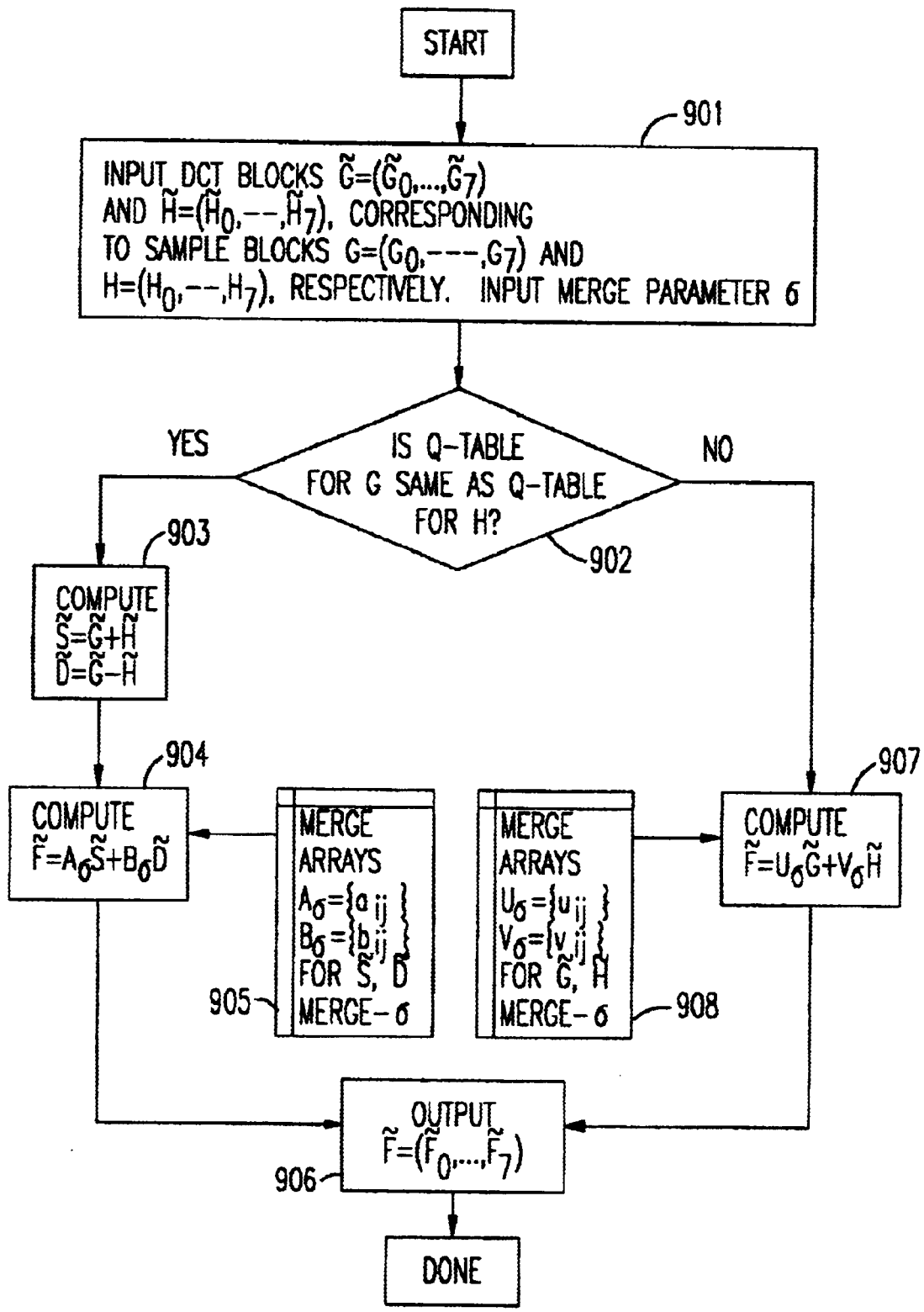
FIG. 9 is a flow diagram showing the logic of a computer implementation of a one-dimensional merge operation of two overlapping 1×8 sample blocks.

FIG. 9 is a flow diagram showing the logic of the computer implementation of the one-dimensional merge of two overlapping 1×8 sample blocks G and H. The process starts with input block 901 where DCT blocks $\tilde{G} = (\tilde{G}_0, \ldots, \tilde{G}_7)$ and $\tilde{H} = (\tilde{H}_0, \ldots, \tilde{H}_7)$, corresponding to sample blocks $G = (G_0, \ldots, G_7)$ and $H = (H_0, \ldots, H_7)$, respectively, are input and the merge parameter σ is input. A test is then made in decision block 902 to determine if the Q-table of G is the same as the Q-table for H. If so, the matrices $\tilde{S} = \tilde{G} + \tilde{H}$ and $\tilde{D} = \tilde{G} - \tilde{H}$ are computed in function block 903. Then, in function block 904, $\tilde{F} = A_\sigma \tilde{S} + B_\sigma \tilde{D}$ is computed using merge arrays 905 containing $A_\sigma = \{a_{ij}\}$, $B_\sigma = \{b_{ij}\}$ for $\tilde{S}, \tilde{D}$ and merge parameter σ. The result of this computation is the output $\tilde{F} = (\tilde{F}_0, \ldots, \tilde{F}_7)$ in output block 906.

If, on the other hand, the quantization table (Q-table) for G is not the same as the Q-table for H, as determined in decision block 902, then in function block 907, $\tilde{F} = U_\sigma \tilde{G} + V_\sigma \tilde{H}$ is computed using merge arrays 908 containing $U_\sigma = \{u_{ij}\}$, $V_\sigma = \{v_{ij}\}$ for $\tilde{G}, \tilde{H}$ and merge parameter σ. The result of this computation is the output $\tilde{F} = (\tilde{F}_0, \ldots, \tilde{F}_7)$ in output block 906.

Figure 10A:
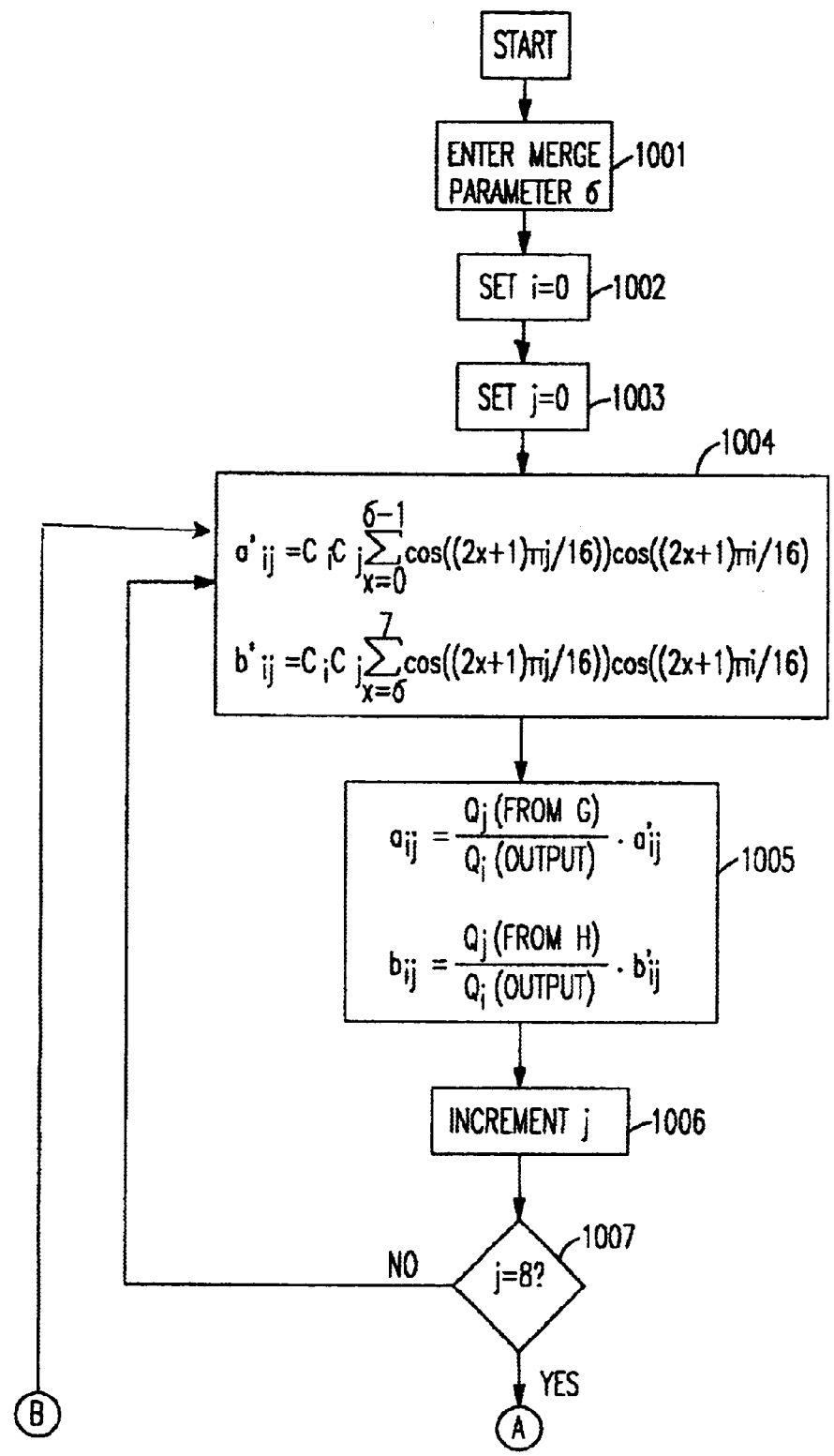
FIGS. 10A and 10B, taken together, are a flow diagram showing the logic of a computer implementation of the construction of pre-computed merge matrices.
Figure 10B:
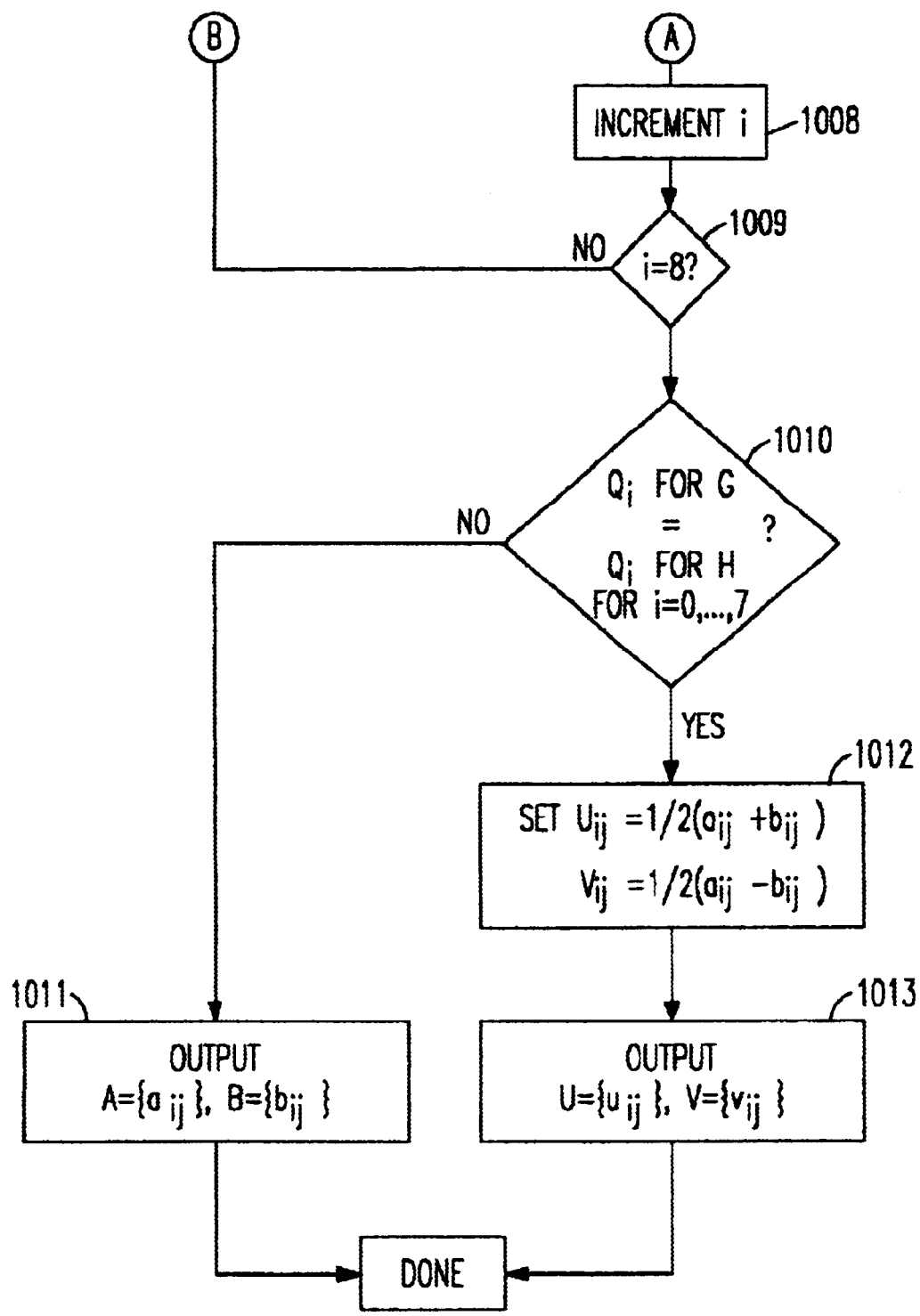

FIGS. 10A and 10B, taken together, show the flow diagram for the construction of the pre-computed merge matrices $A_\sigma$, $B_\sigma$, $U_\sigma$, and $V_\sigma$ for σ=0, ..., 7 in merge arrays 905 and 908. The process starts by entering the merger parameter a in function block 1001. The process is initialized in function blocks 1002 and 1003 by setting i=0 and j=0, respectively, before entering the processing loop. Upon entering the processing loop, the following equations are computed in function block 1004:

$$a'_{ij} = C_i C_j \sum_{x=0}^{m-1} \cos\left(\frac{(2x+1)\pi j}{16}\right)\cos\left(\frac{(2x+1)\pi i}{16}\right)$$

$$b'_{ij} = C_i C_j \sum_{x=m}^{7} \cos\left(\frac{(2x+1)\pi j}{16}\right)\cos\left(\frac{(2x+1)\pi i}{16}\right)$$

This if followed by computing the following equations in function block 1005:

$$a_{ij} = \frac{Q_j \text{ (from } G\text{)}}{Q_i \text{ (output)}} \cdot a'_{ij}$$

$$b_{ij} = \frac{Q_j \text{ (from } H\text{)}}{Q_i \text{ (output)}} \cdot b'_{ij}$$

The index j is incremented in function block 1006, and then a test is made in decision block 1007 to determine if j equals 8. If not, the process loops back to function block 1003; otherwise, the index i is incremented in function block 1008, and then a test is made in decision block 1009 to determine if i equals 8. If not, the process again loops back to function block 1004. In this way, the elements of the merge arrays are generated. When the index i is equal to 8, a test is made in decision block 1010 to determine if the quantization coefficients $Q_i$ for G are equal to the quantization coefficients $Q_i$ for H for i=0, ..., 7. If not, the merge arrays A={$a_{ij}$} and B={$b_{ij}$} are output in output block 1011; otherwise, $u_{ij}$ is set to ½($a_{ij}+b_{ij}$) and $v_{ij}$ is set to ½($a_{ij}-b_{ij}$) in function bock 1012 before outputting the merge arrays U={$u_{ij}$} and V={$v_{ij}$} in output block 1013.

The foregoing process may be practiced with modifications to function block 1005. FIG. 11 shows function block 1005' which calculates $a_{ij}$ and $b_{ij}$ incorporating only the de-quantization according to the invention. If the merged or shifted output will be going to an IDCT block, then re-quantization in the constants is not desired. FIG. 12 shows the function block 1005" which calculates $a_{ij}$ and $b_{ij}$ incorporating only re-quantization according to the invention. If the input came directly from an FDCT, the de-quantization is not needed. FIG. 13 shows the function block 1005''' in which $a_{ij}$ and $b_{ij}$ are set equal to $a_{ij}'$ and $b_{ij}'$ because neither de-quantization nor re-quantization is desired in the constants.

Figure 14:
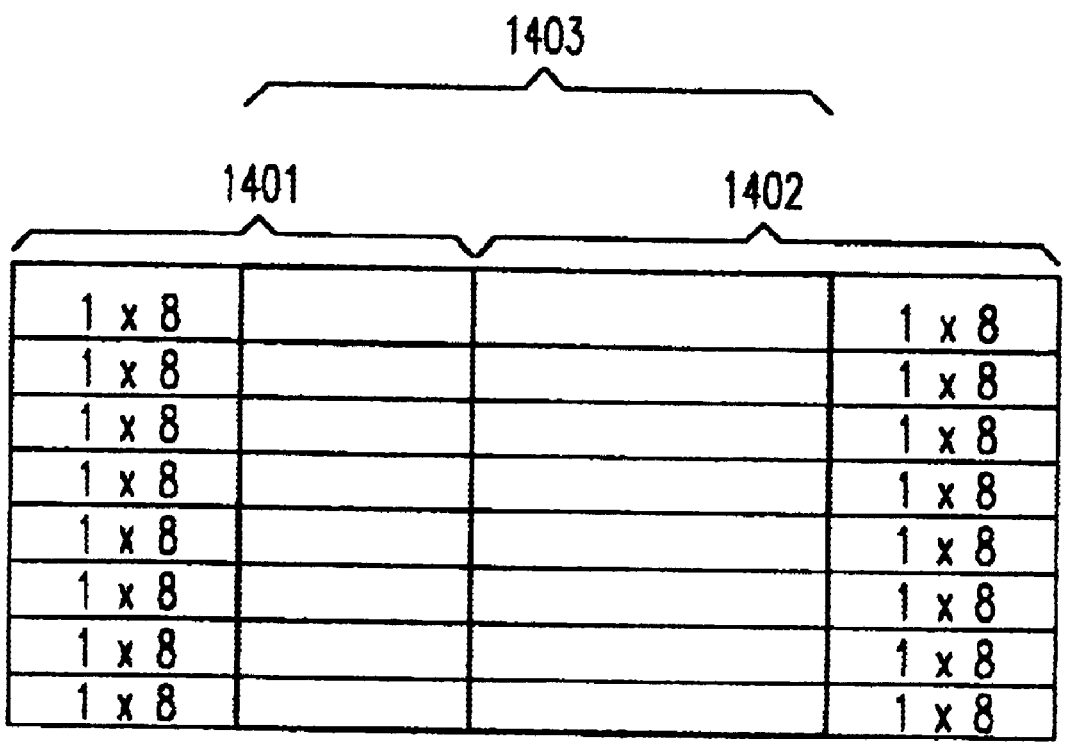
FIG. 14 illustrates how an 8×8 DCT block can be computed from two adjacent two-dimensional 8×8 DCT blocks as eight one-dimensional transform calculations.

In addition, while the invention has been described primarily as a horizontal shift (or merge) of two blocks, those skilled in the art will understand that the shift (or merge) can be made in the vertical direction. Moreover, the one-dimensional shift (or merge) according to the present invention can be extended to the two-dimensional case. FIG. 14 illustrates how an 8×8 block can be computed from two adjacent two-dimensional 8×8 DCT blocks 1401 and 1402 as eight one-dimensional transform calculations. This can be viewed as an extension of FIG. 6 for the 1×8 one-dimensional case. In FIG. 14, the new block 1403, shown in bold line outline overlapping blocks 1401 and 1402, is composed in this example of σ=3 samples of the right-most rows of the block 1401 and the 8−σ=5 samples of the left-most of the block 1402. The one-dimensional equations apply with different quantization values for each row. Therefore, eight sets of shift (or merge) matrices must be calculated.

Summarizing, for a shifting of σ pixels in a sample domain consisting of two adjacent 1×8 blocks G (left block) and H (right block), the DCT coefficients of the sample block composed of the rightmost σ pixels of G are computed followed by the 8−σ leftmost pixels of H, yielding DCT coefficients containing a mixture of sample data from G and H. The inverse transforms for each of the respective samples from G and H are then substituted into the formula to obtain a transformation from the DCT coefficients of each original block into the DCT coefficients for the new, "shifted" or hybrid block. These equations are then optimized by appealing to symmetries and trigonometric identities to yield an even faster transformation.

Merging Operators in Two-Dimensions

We now extend the description to include two-dimensional merge operators and the corresponding action on the DCT-domain. In the two-dimensional case, the input space, again called real domain, is the space of 8×8 matrices, GL(8). The two-dimensional DCT-operator, denoted by $D_2$:GL(8)→GL(8) is $$D_2: \tilde{G} \rightarrow D(D\tilde{G})^T,$$

where D is the one-dimensional DCT-operator. The output domain is called DCT-domain.

We first derive the action on the DCT-domain corresponding to purely vertical merge operators. Let $$M = (AB)$$

be a one-dimensional merge operator. This merge operator defines a two-dimensional merge operator as follows. Let $G_1, G_2 \in GL(8)$ be elements in the real domain, $G_1$ is thought to be a block above $G_2$, GL(8) is the collection of all non-singular 8×8 matrices. Now, we can merge the $G_1$ and $G_2$ column by column:

$$F = (A \ B) \begin{pmatrix} G_1 \\ G_2 \end{pmatrix}$$

or $$F = AG_1 + BG_2.$$

This two-dimensional merge operation can be described completely in the DCT domain. In particular, let $\tilde{F} = D_2(F)$, $\tilde{G}_1 = D_2(G_1)$, $\tilde{G}_2 = D_2(G_2)$ and let $\tilde{M} = (\tilde{A}\tilde{B})$ be the representation on the two-dimensional DCT domain of the merge operator M. In particular, $\tilde{A} = DAD^{-1}$ and $\tilde{B} = DBD^{-1}$.

Lemma 2

The two-dimensional vertical merge operation can be performed on the two-dimensional DCT domain by applying the corresponding one-dimensional merge operator column by column:

$$\tilde{F} = (\tilde{A} \ \tilde{B}) \begin{pmatrix} \tilde{G}_1 \\ \tilde{G}_2 \end{pmatrix}$$

or $$\tilde{F} = \tilde{A}\tilde{G}_1 + \tilde{B}\tilde{G}_2.$$

The proof of this Lemma is a computation. Observe, $G_i = D^{-1}\tilde{G}_i D$ for i=1,2. Hence, $$F = AG_1 + BG_2 = AD^{-1}\tilde{G}_1 D + BD^{-1}\tilde{G}_2 D.$$

So $$\tilde{F} = (D(DF)^T)^T = DFD^{-1} = (DAD^{-1}\tilde{G}_1 D + DBD^{-1}\tilde{G}_2 D)D^{-1},$$

which shows $\tilde{F}=\tilde{A}\tilde{G}_1+\tilde{B}\tilde{G}_2.$

A general two-dimensional merge operation is an operation which combines a vertical one-dimensional merge operator $\tilde{M}_v$ and a horizontal one-dimensional merge operator $\tilde{M}_h$. Let $$\tilde{M}_v=(\tilde{A}_v,\tilde{B}_v)$$

and $$\tilde{M}_h=(\tilde{A}_h,\tilde{B}_h)$$

be the representations of the one-dimensional merge operators in the DCT domain. Now we will describe the action of this two-dimensional merge operator $\tilde{M}$ on the DCT-domain. Let $$\tilde{G} = \begin{pmatrix} \tilde{G}_{11} & \tilde{G}_{12} \\ \tilde{G}_{21} & \tilde{G}_{22} \end{pmatrix}$$

be a square consisting of four blocks in the DCT-domain, $\tilde{G}_{ij} \in GL(8)$. The following Lemma is obtained by applying the previous Lemma to the vertical and horizontal parts of this two-dimensional merge.

Lemma 3

The merge operator $\tilde{M}$ on the two-dimensional DCT-domain is $$\tilde{F} = \begin{pmatrix} \tilde{A}_v & \tilde{B}_v \end{pmatrix} \begin{pmatrix} \tilde{G}_{11} & \tilde{G}_{12} \\ \tilde{G}_{21} & \tilde{G}_{22} \end{pmatrix} \begin{pmatrix} \tilde{A}_h & \tilde{B}_h \end{pmatrix}^T,$$

or $$\tilde{F}=(\tilde{A}_v\tilde{G}_{11}+\tilde{B}_v\tilde{G}_{21})\tilde{A}_h^T+(\tilde{A}_v\tilde{G}_{12}+\tilde{B}_v\tilde{G}_{22})\tilde{B}_h^T.$$

We finish this section with the application of the three one-dimensional improvements, Sum-Difference, Quantization, and Fast-Paths, to the two-dimensional case. Fix an input $$\tilde{G} = \begin{pmatrix} \tilde{G}_{11} & \tilde{G}_{12} \\ \tilde{G}_{21} & \tilde{G}_{22} \end{pmatrix}$$

in the DCT-domain and choose two one-dimensional merge operators in the DCT-domain $\tilde{M}_h$ and $\tilde{M}_v$ to define a two-dimensional merge operator $\tilde{M}$ on the DCT-domain. Let $$\tilde{M}_v=(\tilde{A}_v,\tilde{B}_v)$$

and $$\tilde{M}_h=(\tilde{A}_h,\tilde{B}_h)$$

be the representations of the one-dimensional merge operators in the sum-difference formulation.

Sum-Difference in Two Dimensions

Consider the transformed input $$\begin{pmatrix} \tilde{S}_1 & \tilde{S}_2 \\ \tilde{D}_1 & \tilde{D}_2 \end{pmatrix} = \begin{pmatrix} \tilde{G}_{11}+\tilde{G}_{21} & \tilde{G}_{12}+\tilde{G}_{22} \\ \tilde{G}_{11}-\tilde{G}_{21} & \tilde{G}_{12}-\tilde{G}_{22} \end{pmatrix}.$$

An elementary computation with the block matrices shows Lemma 4:

Lemma 4

The merge operator $\tilde{M}$ on the two-dimensional DCT-domain is $$\tilde{F} = (\tilde{A}_v(\tilde{S}_1+\tilde{S}_2)+\tilde{B}_v(\tilde{D}_1+\tilde{D}_2))\tilde{A}_h^T +$$
$$(\tilde{A}_v(\tilde{S}_1-\tilde{S}_2)+\tilde{B}_v(\tilde{D}_1+\tilde{D}_2))\tilde{B}_h^T$$

where $\tilde{A}_h$, $\tilde{B}_h$ and $\tilde{A}_v$, $\tilde{B}_v$ are the Sum-Difference-representation of respective one-dimensional horizontal and vertical merges.

Observe that a purely vertical (or horizontal) merge operation becomes the operation consisting of applying the one-dimensional merge operator column by column (or row by row).

Quantization in Two Dimensions

Let $Q \in GL(8)$ be a two-dimensional quantization matrix. Generally speaking, quantization matrices do not satisfy special properties. This generality implies that we can not incorporate the de-quantization and re-quantization completely within the merge matrices; in other words, we have to work column by column (or row by row). If X is a matrix, we will denote the $k^{th}$ column of X by $X^k$ and the $k^{th}$ row by $^kX$. Moreover, let $$Q_k=\text{diag}(Q^k),$$

the diagonal matrix using the entries of the $k^{th}$ column. The quantized input $\hat{G}_{ij}$ is given and quantized using the same quantization matrix. Let the transformed input be denoted by $$\begin{pmatrix} \tilde{S}_1 & \tilde{S}_2 \\ \tilde{D}_1 & \tilde{D}_2 \end{pmatrix}$$

After performing the vertical merges, we obtain the following non-quantized information: $\tilde{X}_1, \tilde{X}_2 \in GL(8)$ with $$\tilde{X}_1^k=\tilde{A}_vQ_k\tilde{S}_1^k+\tilde{B}_vQ_k\tilde{D}_1^k,$$

and $$\tilde{X}_2^k=\tilde{A}_vQ_k\tilde{S}_2^k+\tilde{B}_vQ_k\tilde{D}_2^k.$$

Observe that the unquantized output is given by $$\tilde{F}=(\tilde{X}_1+\tilde{X}_2)\tilde{A}_h^T+(\tilde{X}_1-\tilde{X}_2)\tilde{B}_h^T.$$

Let $\hat{Q}$ be the desired quantization matrix for the output and $(\hat{Q}^T)_k$ be the diagonal matrix using the entries of the $k^{th}$ row of $\hat{Q}$. Note that the output quantization matrix as defined here contains terms that are the inverse of the quantization values.

Lemma 5

The $k^{th}$ column of the re-quantized output is given by $$^k\tilde{F}=^k\tilde{S}(\tilde{A}_h^T((\hat{Q})_k)^{-1})+^k\tilde{D}(\tilde{B}_h^T((\hat{Q})_k)^{-1}),$$

where $$\tilde{S}^k=(\tilde{A}_vQ_k)(\tilde{S}_1^k+\tilde{S}_2^k)+(\tilde{B}_vQ_k)(\tilde{D}_1^k+\tilde{D}_2^k)$$

and $$\tilde{D}^k=(\tilde{A}_vQ_k)(\tilde{S}_1^k-\tilde{S}_2^k)+(\tilde{B}_vQ_k)(\tilde{D}_1^k-\tilde{D}_2^k).$$

Observe that the previous Lemma implies that the de-quantization and re-quantization can be completely incorporated in the computation; that is, the sum-difference computation described previously for non-quantized input has the same performance as the computation including de-quantization and re-quantization. Also observe that the matrices $\tilde{A}_h^T((\hat{Q})_k)^{-1}$, $\tilde{B}_h^T((\hat{Q})_k)^{-1}$, $\tilde{A}_v Q_k$, and $\tilde{B}_v Q_k$ can be computed once per image when the input and output quantization is known and have the same non-zero entries as their counter parts in the sum-difference formula.

In the case of a pure vertical (or horizontal) merge operation, we have

Lemma 6

The $k^{th}$ column of the re-quantized output is given by $$\tilde{F}^k = ((\hat{Q}_k)^{-1} \tilde{A}_v Q_k) \tilde{S}^k + ((\tilde{Q}_k)^{-1}) \tilde{B}_v Q_k) \tilde{D}^k.$$

Observe that the matrices $((\hat{Q}_k)^{-1}) \tilde{A}_v Q_k$ and $((\hat{Q}_k)^{-1}) \tilde{B}_v Q_k$ can be computed once per image when the input and output quantization is known and have the same zero entries as $\tilde{A}_v$ and $\tilde{B}_v$.

Fast Paths in Two Dimensions

It has been observed that the DCT-input often has many zero entries. Let $R \subset \{0, 1, 2, \ldots, 7\} \times \{0, 1, 2, \ldots, 7\}$ and assume that the input block G has the property $\tilde{G}(i,j) = 0$ if $(i,j)$ not in $R$.

One could even suppress entries; that is, in case some $\tilde{G}(i,j)$ with $(i,j)$ not in R does not equal zero, we can replace it by zero. As in the one-dimensional case, the matrix computation will become faster; only the terms which involve entries from R have to be computed.

Specific Implementation in Two Dimensions

Assuming that two independent 1×8 image strips G and H lie on the same 1×8 grid, the left σ pels of strip G are merged with the right 8−σ pels of strip H by computing the DCT coefficients for the hybrid strip, yielding DCT coefficients which depend upon a mixture of samples from strips G and H. This is the previously described "Left-Right" case.

Figure 15:
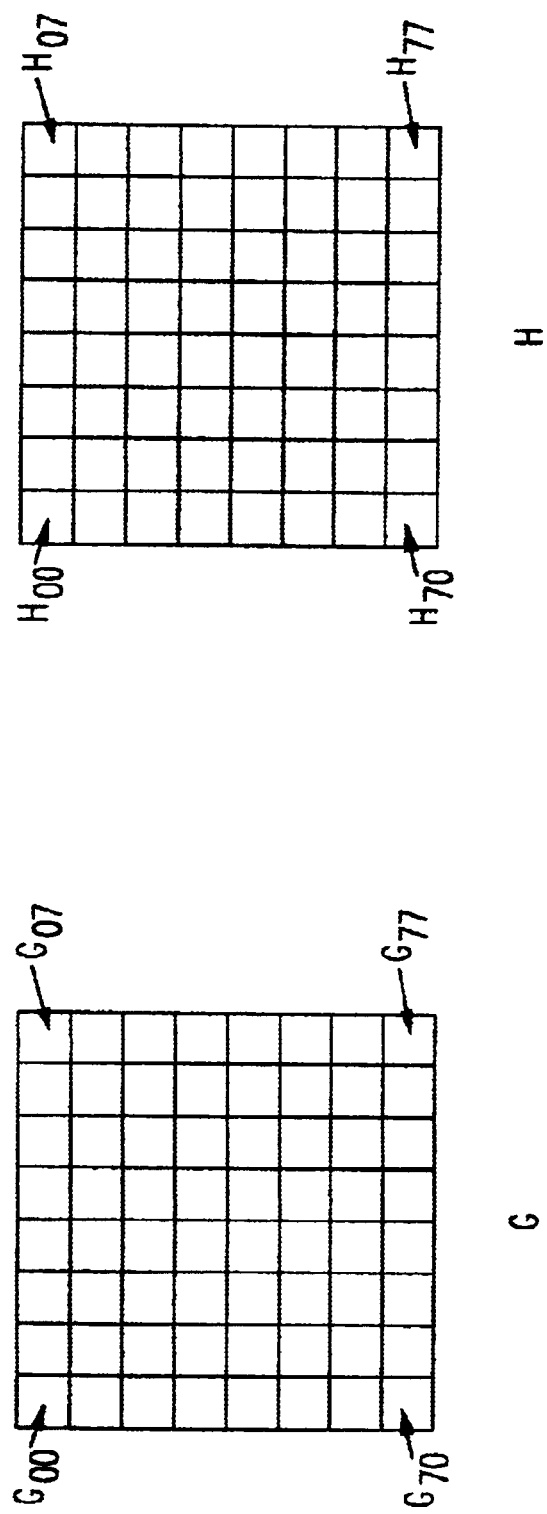
FIG. 15 is a diagram showing two blocks, each having sixty-four samples, for illustrating the extension of the one-dimensional merge algorithm to two dimensions.
Figure 16:
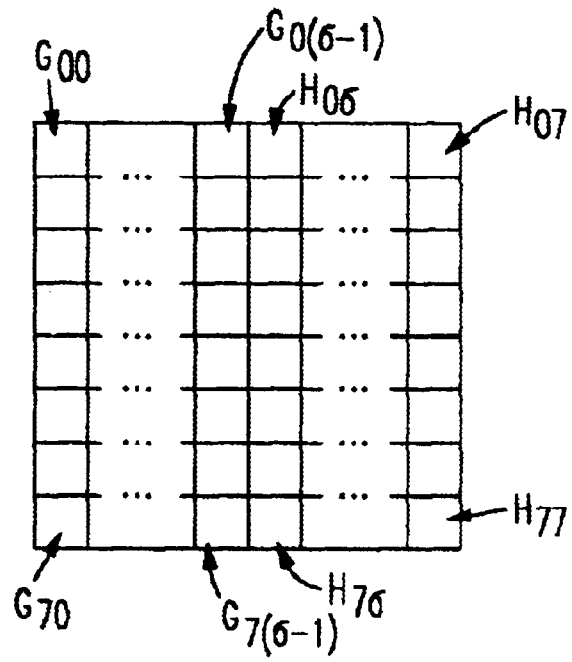
FIG. 16 is a diagram showing a hybrid block generated by merging columns of the two blocks shown in FIG. 15.
Figure 17:
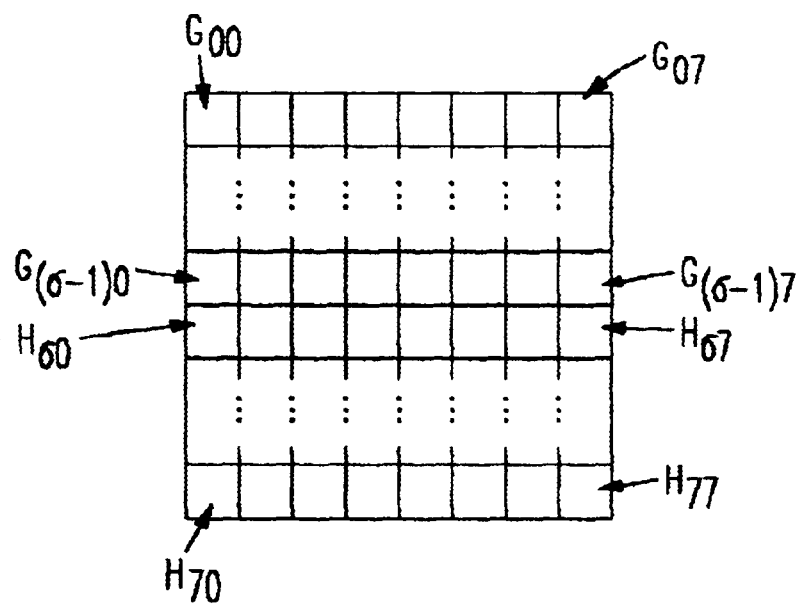
FIG. 17 is a diagram showing a hybrid block generated by merging rows of the two blocks shown in FIG. 15.

It is a simple matter to extend the previous one-dimensional construction to allow for the merging of two 8×8 sample blocks as illustrated in FIG. 15. FIG. 15 shows blocks G and H having 64 samples denoted $G_{00}$ to $G_{77}$ and $H_{00}$ to $H_{77}$, respectively, where the subscript is the row and column index of the sample. Again, it will be understood that the two blocks G and H are on the same grid but are shown separated in FIG. 15 for reasons of clarity. Suppose we desire to form a hybrid block F consisting of the first $\sigma_h$ columns of block G and the last $8-\sigma_h$ columns of block H, as shown in FIG. 16. This is simply done by applying the one-dimensional merge algorithm for each of the eight rows. To obtain a vertical merge of the two blocks in FIG. 15 of the form shown in FIG. 17, in other words, merging the first $\sigma_v$ rows of block G with the $8-\sigma_v$ rows of block H, the one-dimensional algorithm is applied to each column.

Figure 18:
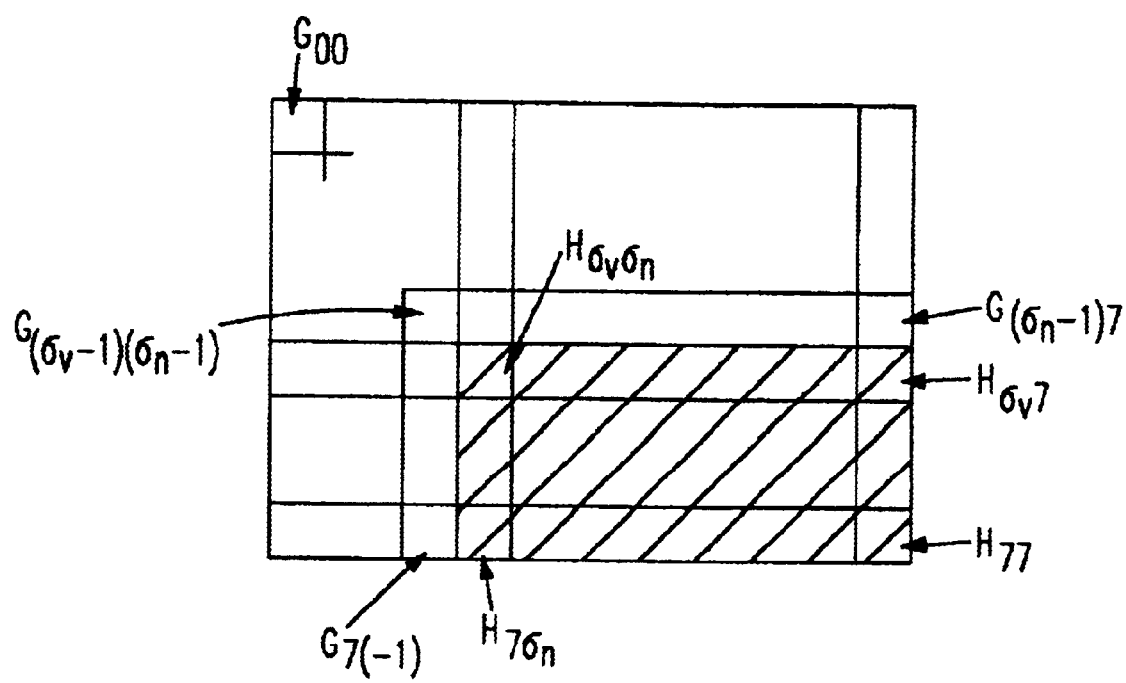
FIG. 18 is a diagram showing a hybrid block generated by corner merging of the two blocks shown in FIG. 15.

Arbitrary corner merges can be obtained by sixteen successive applications of the one-dimensional algorithm, eight on each column and eight on each row, as shown in FIG. 18. To get the hybrid block shown in FIG. 18, the merge algorithm is applied to merge the first $\sigma_h$ rows of block G with the last $8-\sigma_h$ rows of block H as in FIG. 8. By identifying the new hybrid block in FIG. 17 with block H and applying the merge algorithm again to merge the first $\sigma_v$ columns of block G with the last $8-\sigma_v$ columns of block H, the merge shown in FIG. 18 is acquired.

Figure 19:
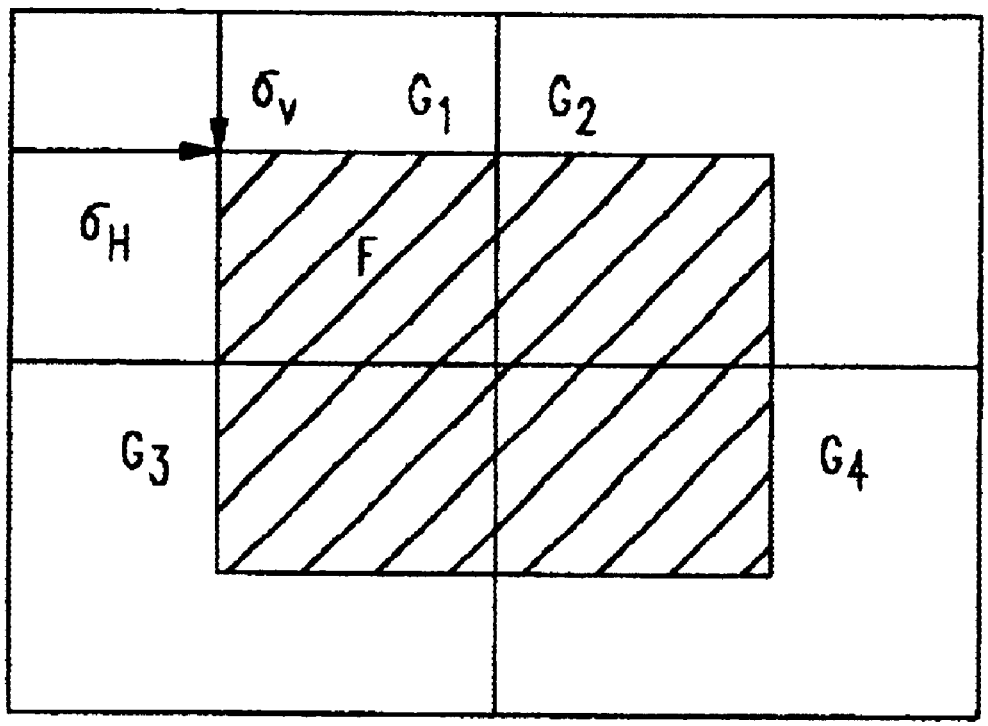
FIG. 19 is a diagram showing a hybrid block generated from four adjacent blocks using the two-dimensional shift algorithm according to the invention.
Figure 20A:
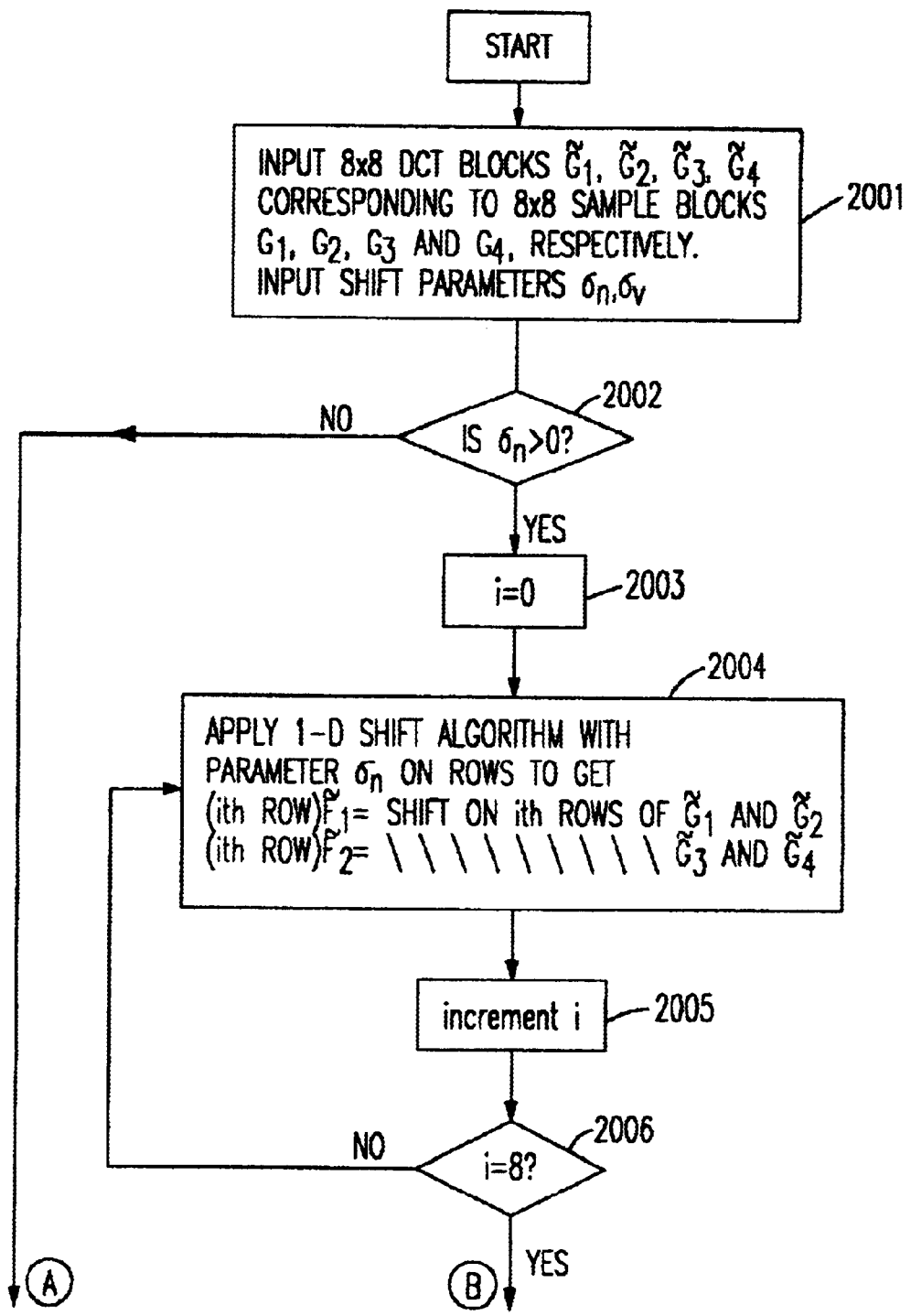
FIGS. 20A, 20B and 20C, taken together, are a flow diagram showing the logic implementing the two-dimensional shift algorithm according to the invention.
Figure 20B:
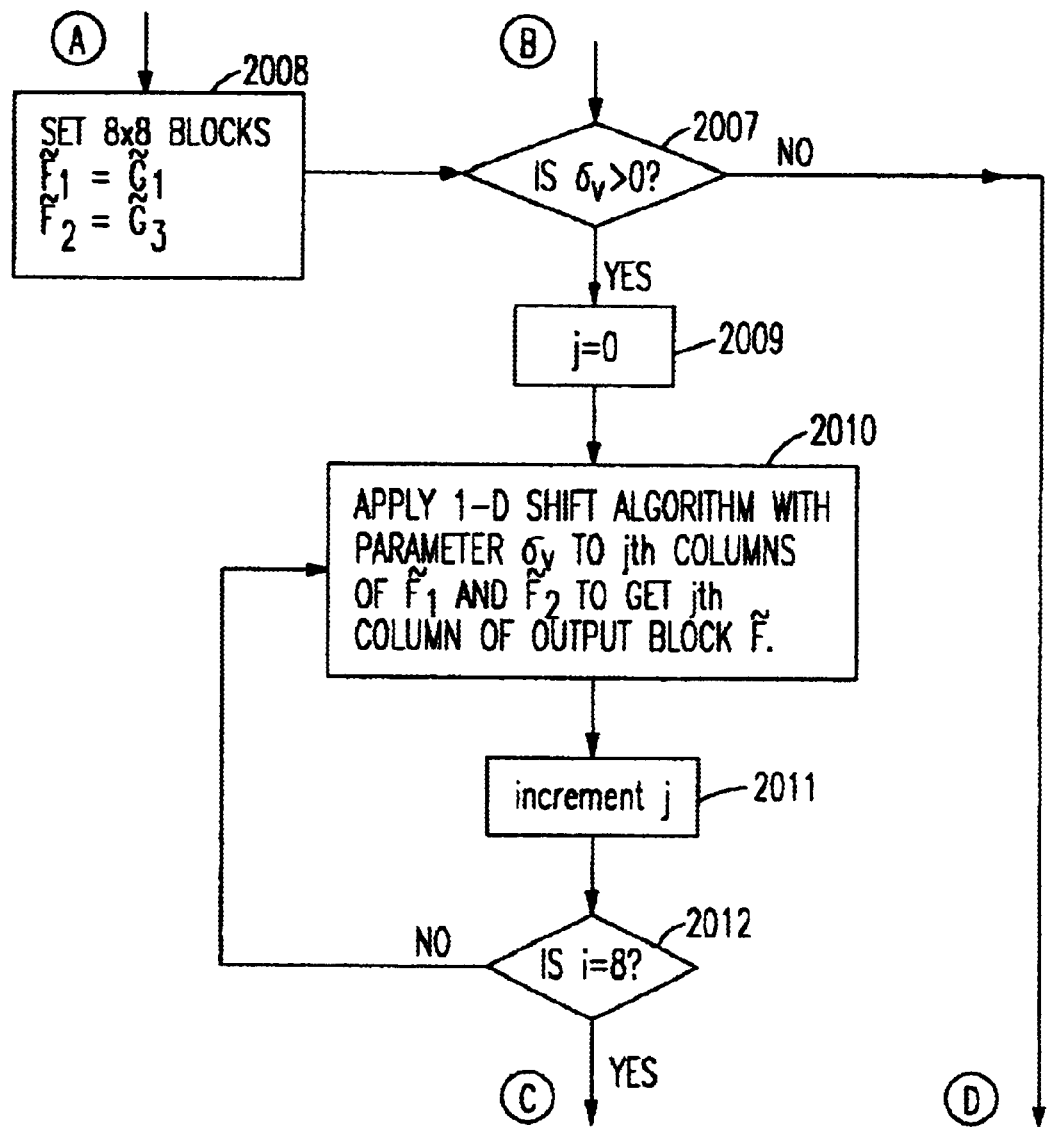
Figure 20C:
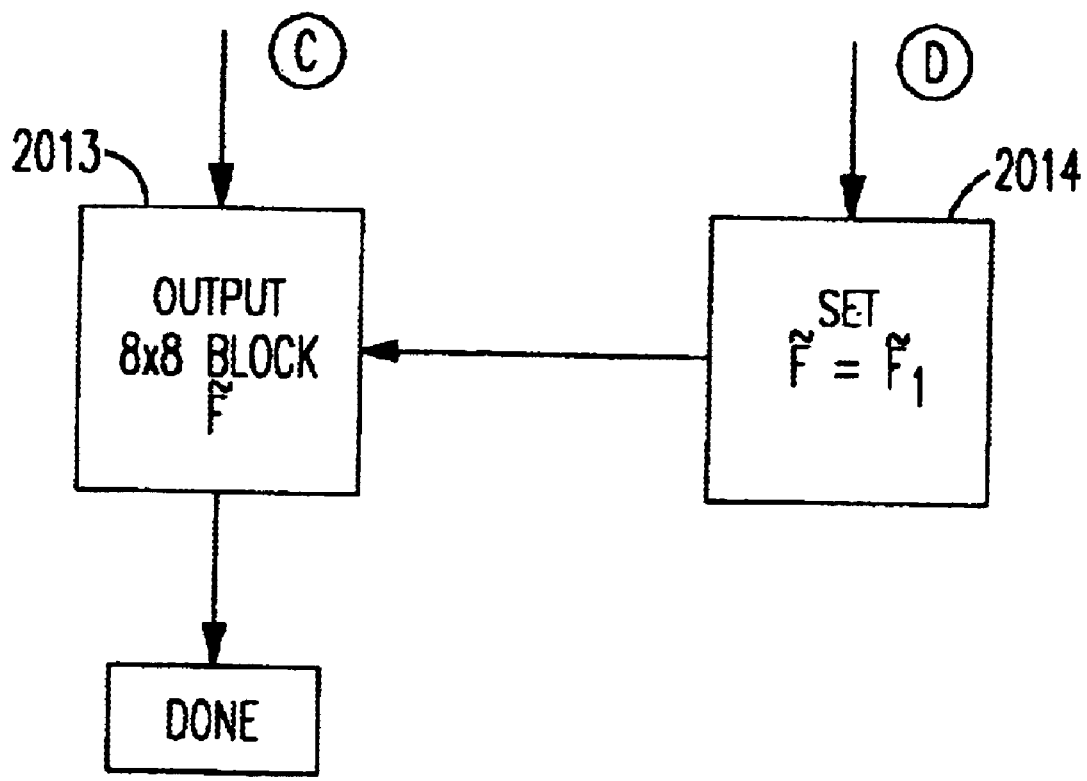

FIG. 19 illustrates the two-dimensional shift algorithm to produce a hybrid 8×8 block F from four adjacent 8×8 blocks $G_1$, $G_2$, $G_3$, and $G_4$. The implementation of the two-dimensional shift algorithm is illustrated in the flow diagram of FIGS. 20A, 20B and 20C. In this algorithm, $\sigma_h$ is the horizontal shift parameter and $\sigma_v$ is the vertical shift parameter. At the beginning of the process shown in FIG. 20A, at least one of $\sigma_h$ and $\sigma_v$ is assumed to be positive. The process starts with input block 2001 where the 8×8 DCT blocks $\tilde{G}_1$, $\tilde{G}_2$, $\tilde{G}_3$, $\tilde{G}_4$ are input, corresponding to the four 8×8 blocks $G_1$, $G_2$, $G_3$, $G_4$, respectively, shown in FIG. 19. Also input are the shift parameters $\sigma_h$ and $\sigma_h$. A test is then made in decision block 2002 to determine if $\sigma_h$ is greater than zero. If so, the index i is set to zero in function block 2003 at the beginning of the processing loop. The processing loop is entered in function block 2004 where the one-dimensional shift algorithm with shift parameter $\sigma_h$ is applied on the rows to get the following:

($i^{th}$ row)$\tilde{F}_1$=shift on $i^{th}$ rows of $\tilde{G}_1$ and $\tilde{G}_2$ ($i^{th}$ row)$\tilde{F}_2$=shift on $i^{th}$ rows of $\tilde{G}_3$ and $\tilde{G}_4$ The index i is then incremented in function block 2005 before a test is made in decision block 2006 to determine if i is equal to eight. If not, the process loops back to function block 2004 to again apply the one-dimensional shift algorithm; otherwise, the processing in this loop is completed, and the process goes to decision block 2007 in FIG. 20B where a test is made to determine if the shift parameter $\sigma_v$ is greater than zero. This point in the processing is also reached if the test in decision block 2002 determines that the shift parameter $\sigma_h$ is not greater than zero, in which case the 8×8 blocks are set as $\tilde{F}_1 = \tilde{G}_1$ and $\tilde{F}_2 = \tilde{G}_3$ in function block 2008 before going to decision block 2007.

FIG. 19 shows how one block is constructed out of four adjacent blocks by a shift along two axes. In actual practice, if an entire image is being shifted, there are adjacent output blocks that use the shifted rows and columns not contained in the output block F. So FIG. 20A has the index j loop over all values from 0 to 7 horizontally. The shifted rows that are not needed for block F will be needed for the block above or below it.

For an application such as MPEG motion compensation, each motion vector can be different so the hybrid blocks do not have common horizontal and vertical shift parameters. In such a case, the index could be initialized and tested to just shift the relevant rows.

Assuming that the shift parameter $\sigma_v$ is greater than zero, as determined in decision block 2007, then the index j is set to zero in function block 2009 before entering the next processing loop. The processing loop begins in function block 2010 where, again, the one-dimensional shift is applied with the shift parameter $\sigma_v$ on columns j to get the following:

($j^{th}$ columns)$\tilde{F}$=shift on $j^{th}$ columns $\tilde{F}_1$ and $\tilde{F}_2$ The index j is then incremented in function block 2011 before a test is made in decision block 2012 to determine if j is equal to eight. If not, the process loops back to function block 2010 to again apply the one-dimensional shift algorithm; otherwise, the processing in this loop is completed, and the process goes to output block 2013 in FIG. 20C. The process also arrives at output block 2013 if the test in decision block 2009 returns a negative; that is, the shift parameter $\sigma_v$ is not greater than zero. In that case, the output 8×8 block is set to $\tilde{F} = \tilde{F}_1$ in function block 2014 before outputting $\tilde{F}$ in output block 2013.

Figure 21:
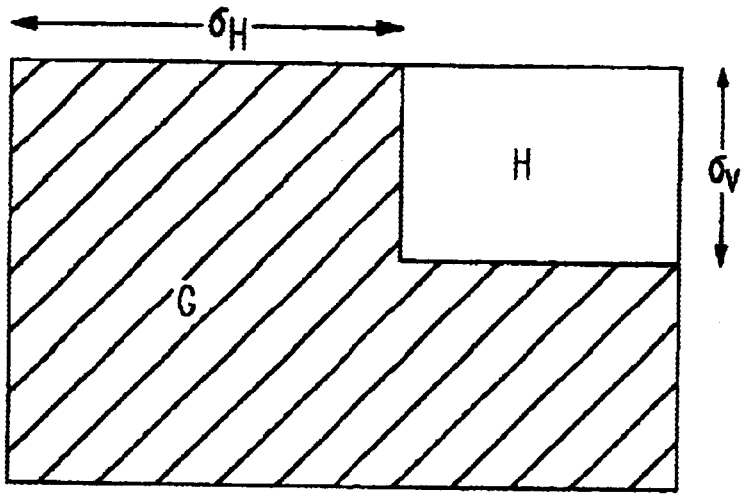
FIG. 21 is a diagram showing a hybrid block generated from overlapping blocks using the two-dimensional merge algorithm according to the invention.
Figure 22:
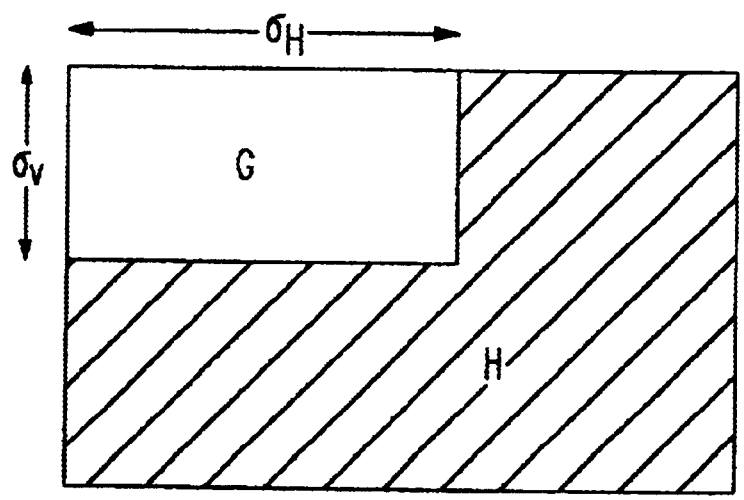
FIG. 22 is a diagram showing the hybrid block resulting from setting $\tilde{F}=\tilde{H}$ in the implementation of the merge algorithm.

FIG. 21 illustrates the hybrid block produced by applying the merge algorithm of the invention, given overlapping 8×8 blocks G and H. Here again, the shift parameters are $\sigma_h$ and $\sigma_v$, as shown in FIG. 21. FIG. 22 illustrates the hybrid block produced if, in function block 2308 of FIG. 23B, the 8×8 blocks are set to $\tilde{F}=\tilde{H}$.

Figure 23A:
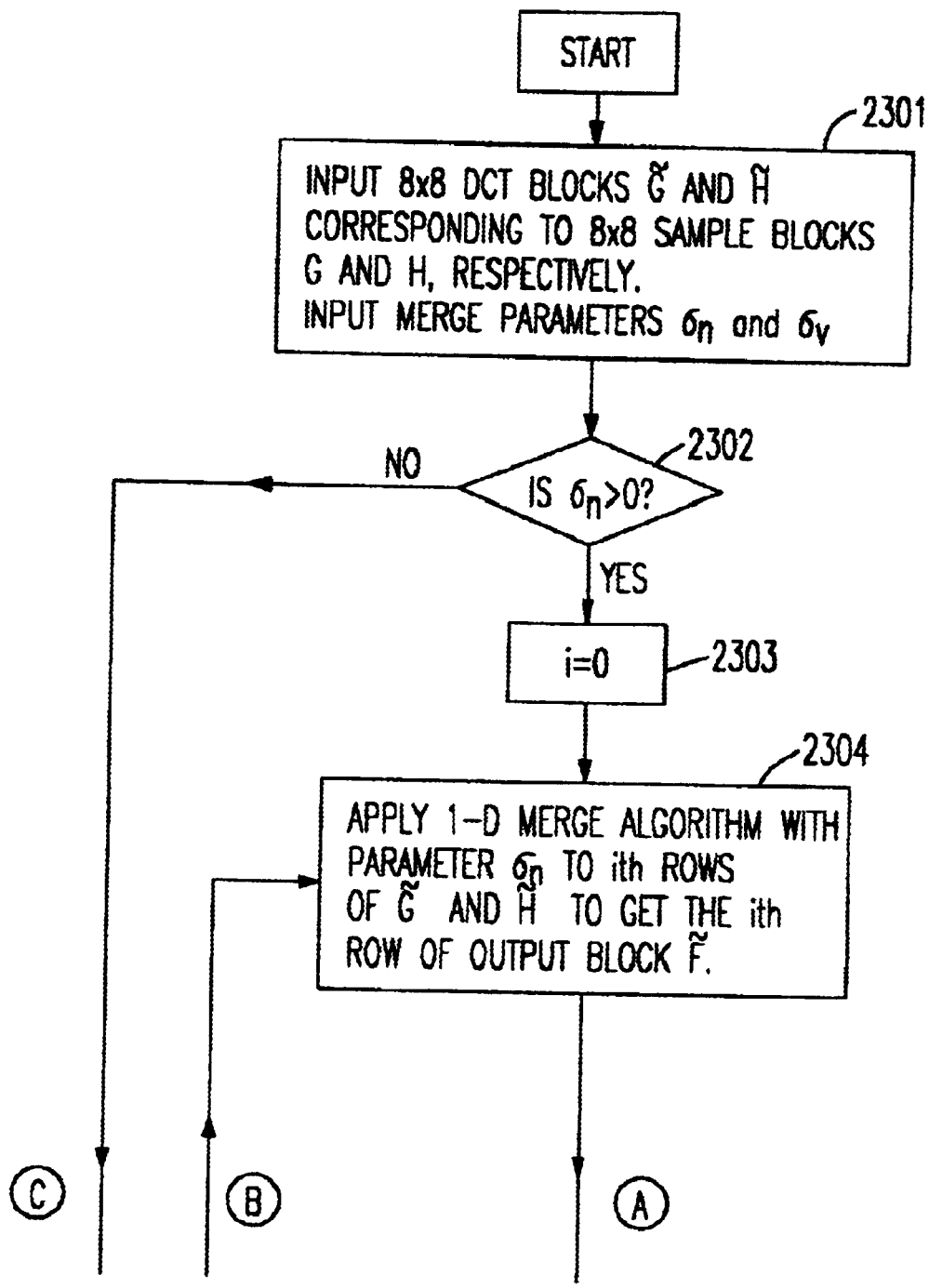
FIGS. 23A, 23B and 23C, taken together, are a flow diagram showing the logic implementing the two-dimensional merge algorithm according to the invention.
Figure 23B:
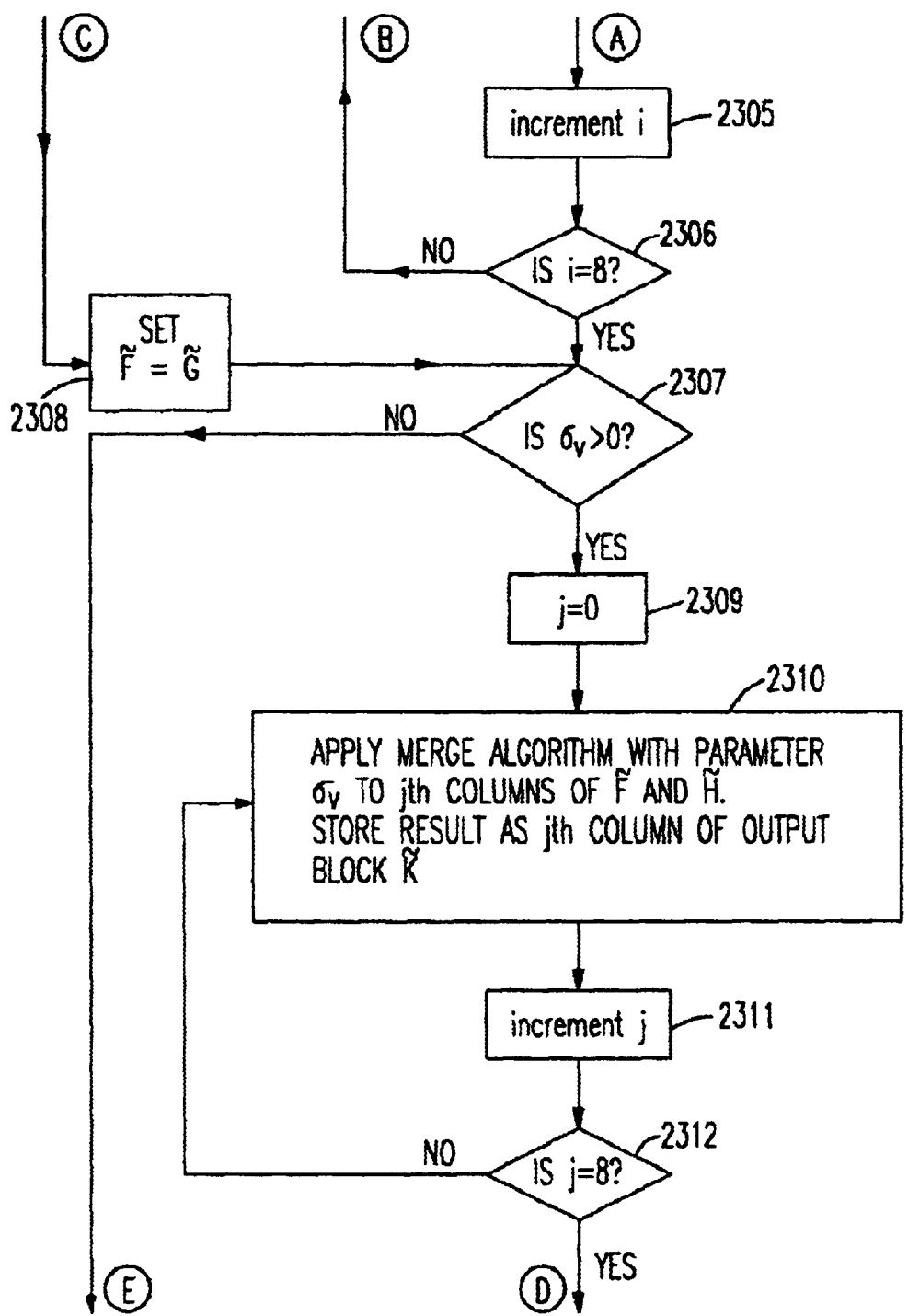
Figure 23C:
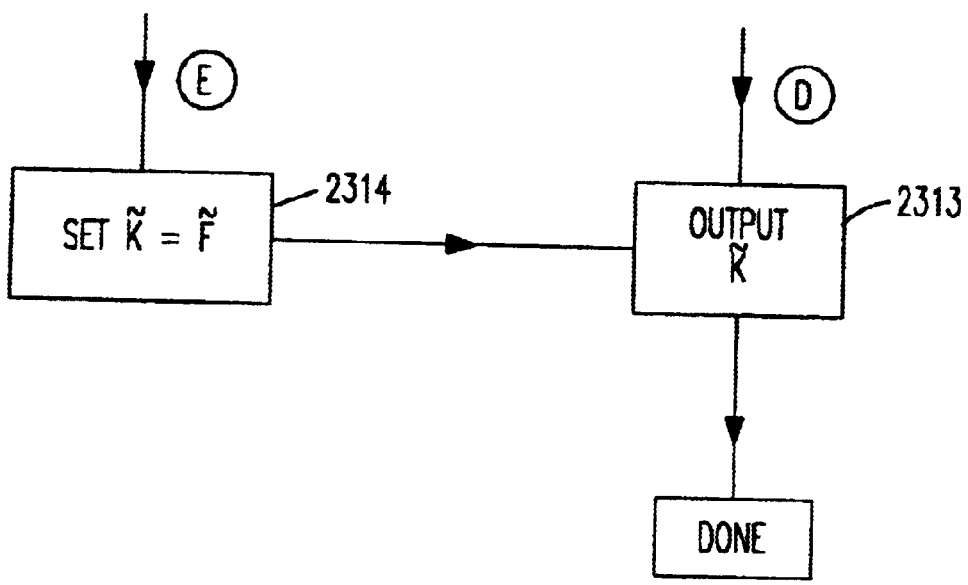

Turning now to the flow diagram of FIGS. 23A, 23B and 23C, the process starts by inputting the 8×8 DCT blocks $\tilde{G}$ and $\tilde{H}$, corresponding to the 8×8 sample blocks G and H, respectively. Also, input are the merge parameters are $\sigma_h$ and $\sigma_v$, where again at least one of the merge parameters are assumed to be positive. A test is then made in decision block 2302 to determine if $\sigma_h$ is greater than zero; that is, is there a horizontal component in the merge? If so, the index i is set to zero in function block 2303 at the beginning of the processing loop. The processing loop is entered in function block 2304 where the one-dimensional merge algorithm with merge parameter $\sigma_h$ is applied to the $i^{th}$ rows of $\tilde{G}$ and $\tilde{H}$, and the result is stored as vector $\tilde{F}_i$. The index i is then incremented in function block 2305 before a test is made in decision block 2306 to determine if i is equal to eight. If not, the process loops back to function block 2304 to again apply the one-dimensional merge algorithm; otherwise, the processing in this loop is completed, and the process goes to decision block 2307 where a test is made to determine if the merge parameter $\sigma_v$ is greater than zero. This point in the processing is also reached if the test in decision block 2302 determines that the merge parameter $\sigma_h$ is not greater than zero, in which case the 8×8 blocks are set as $\tilde{F}=\tilde{G}$ in function block 2308 before going to decision block 2307. Again, if the 8×8 blocks are set to $\tilde{F}=\tilde{H}$ in function block 2308, the resulting hybrid block is as shown in FIG. 22 rather than as shown in FIG. 21.

Assuming that the merge parameter $\sigma_v$ is greater than zero, as determined in decision block 2307, then the index j is set to zero in function block 2309 before entering the next processing loop. The processing loop begins in function block 2310 where, again, the one-dimensional merge is applied with the merge parameter $\sigma_v$ on columns j of $\tilde{F}$ and $\tilde{H}$ and the result is stored in $\tilde{K}_j$ (the $i^{th}$ column of $\tilde{K}$). The index j is then incremented in function block 2311 before a test is made in decision block 2312 to determine if j is equal to eight. If not, the process loops back to function block 2310 to again apply the one-dimensional merge algorithm; otherwise, the processing in this loop is completed, and the process goes to function block 2313 in FIG. 23C where the hybrid block $\tilde{K}$ is assembled from the eight columns $\{\tilde{K}_j\}$. The process also arrives at function block 2313 if the test in decision block 2309 returns a negative; that is, the merge parameter $\sigma_v$ is not greater than zero. In that case, $\tilde{K}$ is set equal to $\tilde{F}$ in function block 2314. $\tilde{K}$ is output in the output block 2313.

Box 1005 in FIG. 10A illustrated introducing the de-quantization into the constants for the one-dimensional merge or shift operations. These may be the preferred equations if only one of the merge (or shift) parameters, $\sigma_h$ and $\sigma_v$, are non-zero. However, in the case that both a horizontal and vertical operation are desired, box 1005' may be used to generate the constants including the de-quantization for the operation along the first axis and box 1005" may be used to generate the constants including the re-quantization for the operation along the second axis. Additional precision may be desirable for the intermediate results between the one-dimensional operations.

Alternatively, box 1005 may be used for the one-dimensional operations along both axes. Incorporating both the de-quantization and re-quantization allows setting to zero small coefficients whose magnitudes are below a threshold while keeping high-precision for the rest of the quantized transform coefficients between the operations along the first axis and the operations along the second axis. The magnitude of the threshold for determining which coefficients are to be zeroed may be more, equal to, or less than 0.5.

Although we have focused our attention on the Discrete Cosine Transform (DCT) since we are interested in processing JPEG (Joint Photographic Experts Group) images, the disclosed algorithm can be easily extended to any other situation where orthogonal linear transformations are applied to a real sample space to merge signals (e.g., the Hadamard-Walsh Transform, used in digital image and speech processing).

Another application example for use of the present invention is in the high-end digital graphics market which uses digital images with sometimes more than 100 megapixels. Glossy advertising brochures and the large photographic trade show booth backdrops are just two examples of the use of such high quality digital imagery. High-quality lossy JPEG compression are sometimes used to keep the transmission and storage costs down. Shifting the block grid, merging multiple images into one image, and/or cropping an image has traditionally required de-compressing and re-compressing which introduce undesirable errors. Our invention avoids these problems by working exclusively in the transform domain.

The above examples for the concepts of the present invention are usual for image and video transform data. The wide use of the Internet has shown the value of JPEG and MPEG compressed image data. When JPEG images are to be printed, then manipulations such as a change of scale or a change of orientation may be required. Use of the present invention overcomes the problem inherent in propagating the errors from the rounding and clipping.

For the printing of images, the first manipulation (in a series of steps that would traditionally require multiple de-compressions and re-compressions if all of the data were not simultaneously available) might rotate the image 90° to orient the image with the printing direction. The second manipulation might crop the image to select just a piece of it for use on the current page. A third manipulation might merge several independent images into one composite image.

Fan-folded advertising brochures typically are composed of multiple individual pictures. Today's highest end laser printers print more than one page at a time. In such cases, the images generally do not overlap, but may not have the same quantization, positioning relative to the reference grid such as the 8×8 block structure for JPEG DCTs, or orientation. If a single image is required to simplify on-the-fly decoding and printing, then composing the final picture in the transform domain avoids the precision problems inherent in the traditional ways of working in the real domain.

Similar implementations are performed for other industrial, commercial, and military applications of digital processing employing a transform and an inverse transform of data representing a phenomenon when the data is stored in the transform domain. These are thus other representative applications wherein the use of the present invention is highly advantageous.

It is further noted that this invention may also be provided as an apparatus or a computer product. For, example, it may be implemented as an article of manufacture comprising a computer usable medium having computer readable program code means embodied therein for causing a computer to perform the methods of the present invention.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method for transform processing of transformed data comprising the steps of:

receiving first and second input blocks of transform coefficients for two blocks G and H; and merging the blocks G and H by combining transform coefficients of the blocks G and H composed of contiguous $\sigma_1$ samples of block G followed by contiguous $N_1-\sigma_1$ samples of block H along a first dimension, and combining coefficients of the merged block with transform coefficients from one of the G or H blocks composed of contiguous $\sigma_2$ samples from one block and $N_2-\sigma_1$ from the other block along a second dimension orthogonal to the first dimension, where the first and second input blocks are $N_1 \times N_2$ and $\sigma_1$ and $\sigma_2$ are merge parameters for the first and second dimensions, respectively, and $N_1 > \sigma_1$ and $N_2 > \sigma_2$, yielding the hybrid block F in the transform domain.

2. The computer implemented method for transform domain processing of transformed data recited in claim 1, further comprising the steps of:

selecting said merge parameters $\sigma_1$ and $\sigma_2$ along first and second orthogonal axes;

generating a transformation from the transform coefficients of original blocks into the transform coefficients for a new hybrid block; and pre-computing the constants for the transformation equations for each merge parameter.

3. The computer implemented method for transform domain processing of transformed data recited in claim 1, wherein the first and second data are image data, the samples are from one component of the image data and the blocks are from different images.

4. The computer implemented method for transform domain processing of transformed data recited in claim 3, wherein the first dimension is horizontal and the second dimension is vertical, $\sigma_1$ and $\sigma_2$ being merge parameters $\sigma_h$ and $\sigma_v$, respectively.

5. The computer implemented method for transform domain processing of transformed data recited in claim 3, wherein the first dimension is vertical and the second dimension is horizontal, $\sigma_1$ and $\sigma_2$ being merge parameters $\sigma_v$ and $\sigma_h$, respectively.

6. The computer implemented method for transform domain processing of transformed data recited in claim 3, wherein the step of transforming uses the Discrete Cosine Transform (DCT).

7. The computer implemented method for transform domain processing of transformed data recited in claim 6, wherein $N_1=8$ and $N_2=8$.

8. The computer implemented method for transform domain processing of transformed data recited in claim 6, wherein the transformed images are JPEG (Joint Photographic Experts Group) compressed images.

9. The computer implemented method for transform domain processing of transformed data recited in claim 6, where in the transformed images are MPEG (Moving Pictures Experts Group) compressed images.

10. The computer implemented method for transform domain processing of transformed data recited in claim 1, further comprising the step of generating independent one-dimensional representations for each of two orthogonal axes for the blocks G and H to obtain transformations of coefficients of each block.

11. The computer implemented method for transform domain processing of transformed data recited in claim 10, further comprising the step of optimizing the one-dimensional representations using symmetries and trigonometric identities to yield a fast transformations.

12. The computer implemented method for transform domain processing of transformed data recited in claim 1, wherein the hybrid block F is constructed using pre-computed merge arrays for the merge parameters $\sigma_1$ and $\sigma_2$.

13. The computer implemented method for transform domain processing of transformed data recited in claim 12, wherein the sample blocks G and H are overlapping and the step of merging is performed along a first axis by computing a sum and a difference of coefficients of the transformed data for the blocks G and H in the first axis to produce an intermediate block and along a second axis orthogonal to the first axis by computing a sum and a difference of coefficients of the transformed data for the intermediate block and one of said blocks G and H.

14. The computer implemented method for transform domain processing of transformed data recited in claim 13, wherein and the hybrid block F is constructed by accessing the pre-computed merge arrays to generate coefficients for the hybrid block F as a function of the computed sum and difference of coefficients of the transformed data for the intermediate block and one of said blocks G and H.

15. A computer system for transform processing of transformed data comprising:

temporary storage means for storing first and second input blocks of transformed coefficients for two blocks G and H; and shifter and merger means accessing the temporary storage means for the respective coefficients from the blocks G and H and combining the transform coefficients of the blocks G and H composed of contiguous $\sigma_1$ samples of block G followed by contiguous $N_1-\sigma_1$ samples of block H along a first dimension, and combining coefficients of the shifted or merged block with transform coefficients from one of the G or H blocks composed of contiguous $\sigma_2$ samples from one block and $N_2-\sigma_2$ from the other block along a second dimension orthogonal to the first dimension, where the first and second input blocks are $N_1 \times N_2$ and $\sigma_1$ and $\sigma_2$ are merge parameters for the first and second dimensions, respectively, and $N_1 > \sigma_1$ and $N_2 > \sigma_2$, yielding a hybrid block F in the transform domain.

16. The computer system recited in claim 15, wherein the computer system is a printing system using Joint Photographic Experts Group (JPEG) compressed images and wherein the temporary storage means and the shifter and merger means comprise a printer server.

17. The computer system recited in claim 16, wherein the printer server further comprises:

a JPEG entropy decoder receiving JPEG compressed data and storing transform coefficients on said temporary storage means; and a JPEG entropy encoder accessing coefficients of the hybrid block F in the transform domain from said temporary storage means and outputting shifted and/or merged JPEG compressed composite data.

18. The computer system recited in claim 17, further comprising:

a source of image data;

a JPEG encoder receiving image data and generating JPEG compressed image data, the JPEG compressed data being transmitted to said printer server;

a JPEG decoder connected to receive an output from said printer server and reconstructing composite image data; and a printer receiving the composite image data and printing a composite image.

19. The computer system recited in claim 18, wherein said source of image data is a scanner.

20. A computer implemented method for transform domain processing of transformed data comprising the steps of:

receiving first and second input blocks of transform coefficients of two $N_1 \times N_2$ blocks G and H;

generating a transformation from the transform coefficients of each original block G and H into transform coefficients for a new hybrid block F;

generating constants from output quantization values for each transform coefficient for the hybrid block F; and merging the first and second input blocks of data, by combining transform coefficients of the blocks G and H composed of contiguous $\sigma_1$ samples of block G followed by contiguous $N_1-\sigma_1$ samples of block H in a first dimension, and combining transform coefficients from the merged block and one of the blocks G or H composed of $\sigma_2$ samples of the merged block followed by contiguous $N_2-\sigma_2$ samples of the block G or H in a second dimension orthogonal to the first dimension, where $\sigma_1$ and $\sigma_2$ are merge parameters and $N_1>\sigma_1$ and $N_2>\sigma_2$, yielding coefficients containing a mixture of sample data from blocks G and H to yield quantized coefficients for said hybrid block F in the transform domain.

21. The computer implemented method for transform domain processing of transformed data recited in claim 20, further comprising the step of zeroing intermediate high-precision quantized transform coefficients whose magnitudes are below a threshold between the merge operations on the two axes.

22. A computer implemented method for transform domain processing of transformed data comprising the steps of:

entropy decoding first and second input blocks of data to generate two blocks $N_1 \times N_2$ G and H of quantized transform coefficients;

generating a transformation from the transform coefficients of each original block G and H into transform coefficients for a new hybrid block F;

generating constants from input quantization values for each transform coefficient for said input blocks G and H; and merging the first and second input blocks of data, by combining quantized transform coefficients of the blocks G and H composed of contiguous $\sigma_1$ samples of block G followed by contiguous $N_1-\sigma_1$ samples of block H in a first dimension, and combining transform coefficients from the merged block and one of the blocks G or H composed of $\sigma_2$ samples of the merged block followed by contiguous $N_2-\sigma_2$ samples of the block G or H in a second dimension orthogonal to the first dimension, where $\sigma_1$ and $\sigma_2$ are merge parameters and $N_1>\sigma_1$ and $N_2>\sigma_2$, yielding coefficients containing a mixture of sample data from blocks G and H to yield said hybrid block F in the transform domain.

23. A computer implemented method for transform domain processing of transformed data comprising the steps of:

entropy decoding first and second input blocks of data to generate two blocks $N_1 \times N_2$ G and H of quantized transform coefficients;

generating a transformation from the transform coefficients of each original block G and H into transform coefficients for a new hybrid block F;

generating constants from input quantization values for each transform coefficient for said input blocks G and H and from the output quantization values for each transform coefficient for said hybrid block F; and merging the first and second input blocks of data, by combining quantized transform coefficients of the blocks G and H composed of contiguous $\sigma_1$ samples of block G followed by contiguous $N_1-\sigma_1$ samples of block H in a first dimension, and combining transform coefficients from the merged block and one of the blocks G or H composed of $\sigma_2$ samples of the merged block followed by contiguous $N_2-\sigma_2$ samples of the block G or H in a second dimension orthogonal to the first dimension, where $\sigma_1$ and $\sigma_2$ are merge parameters and $N_1>\sigma_1$ and $N_2>\sigma_2$, yielding coefficients containing a mixture of sample data from blocks G and H to yield quantized transform coefficients for said hybrid block F in the transform domain.

24. The computer implemented method for transform domain processing of transformed data recited in claim 23, further comprising the step of zeroing intermediate high-precision quantized transform coefficients whose magnitudes are below a threshold between the merge operations on the two axes.

25. A computer implemented method for transform processing of transformed data comprising the steps of:

receiving first, second, third and fourth input blocks of transform coefficients for four blocks $G_{11}, G_{12}, G_{21}$ and $G_{22}$ respectively corresponding to said first, second, third and fourth input blocks of data in a 2×2 array; and shifting the blocks $G_{11}, G_{12}, G_{21}$ and $G_{22}$ in two dimensions by (i) combining transform coefficients to shift a first pair of adjacent blocks along a first axis selected from the blocks $G_{11}, G_{12}, G_{21}$ and $G_{22}$ and composed of contiguous $\sigma_1$ samples of a first block of the first pair followed by contiguous $N_1-\sigma_1$ samples of a second block of the first pair along said first axis to generate a first intermediate hybrid block $F_1$ in the transform domain, (ii) combining transform coefficients to shift a second pair of remaining adjacent blocks from the blocks $G_{11}, G_{12}, G_{21}$ and $G_{22}$ along said first axis and composed of contiguous $\sigma_1$ samples of a first block of the second pair followed by contiguous $N_1-\sigma_1$ samples of a second block of the second pair along said first axis to generate a second intermediate hybrid block $F_2$ in the transform domain, and (iii) combining transform coefficients of the first intermediate hybrid block $F_1$ with transform coefficients from the second intermediate hybrid block $F_2$ composed of contiguous $\sigma_2$ samples from one block and $N_2-\sigma_2$ from the other block along a second axis orthogonal to the first axis, where the first, second, third and fourth input blocks are $N_1 \times N_2$ and $\sigma_1$ and $\sigma_2$ are shift parameters for the first and second dimensions, respectively, and $N_1>\sigma_1$ and $N_2>\sigma_2$, yielding the hybrid block F in the transform domain.

26. The computer implemented method for transform processing of transformed data recited in claim 25, further comprising the steps of:

selecting said shift parameters $\sigma_1$ and $\sigma_2$ along said first and second orthogonal axes;

generating a transformation from the transform coefficients of original blocks into the transform coefficients for a new hybrid block; and pre-computing constants for each selected shift parameter.

27. A computer implemented method for transform domain processing of transformed data comprising the steps of:

receiving first, second, third and fourth input blocks of transform coefficients for four blocks $G_{11}$, $G_{12}$, $G_{21}$ and $G_{22}$ respectively corresponding to said first, second, third and fourth input blocks of data in a 2×2 array;

generating a transformation from the transform coefficients of each original block into transform coefficients for a new hybrid block;

generating constants from output quantization values for each transform coefficient for the new hybrid block; and shifting the blocks $G_{11}$, $G_{12}$, $G_{21}$ and $G_{22}$ in two dimensions by (i) combining transform coefficients to shift a first pair of adjacent blocks along a first axis selected from the blocks $G_{11}$, $G_{12}$, $G_{21}$ and $G_{22}$ and composed of contiguous $\sigma_1$ samples of a first block of the first pair followed by contiguous $N_1-\sigma_1$ samples of a second block of the first pair along said first axis to generate a first intermediate hybrid block $F_1$ in the transform domain, (ii) combining transform coefficients to shift a second pair of remaining adjacent blocks from the blocks $G_{11}$, $G_{12}$, $G_{21}$ and $G_{22}$ along said first axis and composed of contiguous $\sigma_1$ samples of a first block of the second pair followed by contiguous $N_1-\sigma_1$ samples of a second block of the second pair along said first axis to generate a second intermediate hybrid block $F_2$ in the transform domain, and (iii) combining transform coefficients of the first intermediate hybrid block $F_1$ with transform coefficients from the second intermediate hybrid block $F_2$ composed of contiguous $\sigma_2$ samples from one block and $N_2-\sigma_2$ from the other block along a second axis orthogonal to the first axis, where the first, second, third and fourth input blocks are $N_1 \times N_2$ and $\sigma_1$ and $\sigma_2$ are shift parameters for the first and second dimensions, respectively, and $N_1 > \sigma_1$ and $N_2 > \sigma_2$, yielding the hybrid block F in the transform domain.

28. The computer implemented method for transform domain processing of transformed data recited in claim 27, further comprising the step of zeroing intermediate high-precision quantized transform coefficients whose magnitudes are below a threshold between the shift operations on the two axes.

29. A computer implemented method for transform domain processing of transformed data comprising the steps of:

entropy decoding first, second, third and fourth input blocks of data in a 2×2 array to generate four blocks $G_{11}$, $G_{12}$, $G_{21}$ and $G_{22}$ of quantized transform coefficients respectively corresponding to said first, second, third and fourth input blocks of data in said 2×2 array;

generating transformation from the transform coefficients of each original block into transform coefficients for a new hybrid block;

generating constants from input quantization values for each transform coefficient for said input blocks; and shifting the blocks $G_{11}$, $G_{12}$, $G_{21}$ and $G_{22}$ in two dimensions by (i) combining quantized transform coefficients to shift a first pair of adjacent blocks along a first axis selected from the blocks $G_{11}$, $G_{12}$, $G_{21}$ and $G_{22}$ and composed of contiguous $\sigma_1$ samples of a first block of the first pair followed by contiguous $N_1-\sigma_1$ samples of a second block of the first pair along said first axis to generate a first intermediate hybrid block $F_1$ in the transform domain, (ii) combining quantized transform coefficients to shift a second pair of remaining adjacent blocks from the blocks $G_{11}$, $G_{12}$, $G_{21}$ and $G_{22}$ along said first axis and composed of contiguous $\sigma_1$ samples of a first block of the second pair followed by contiguous $N_1-\sigma_1$ samples of a second block of the second pair along said first axis to generate a second intermediate hybrid block $F_2$ in the transform domain, and (iii) combining quantized coefficients of the first intermediate hybrid block $F_1$ with transform coefficients from the second intermediate hybrid block $F_2$ composed of contiguous $\sigma_2$ samples from one block and $N_2-\sigma_2$ from the other block along a second axis orthogonal to the first axis, where the first, second, third and fourth input blocks are $N_1 \times N_2$ and $\sigma_1$ and $\sigma_2$ are shift parameters for the first and second dimensions, respectively, and $N_1 > \sigma_1$ and $N_2 > \sigma_2$, yielding the hybrid block F in the transform domain.

30. A computer implemented method for transform domain processing of transformed data comprising the steps of:

entropy decoding first, second, third and fourth input blocks of data in a 2×2 array to generate four blocks $G_{11}$, $G_{12}$, $G_{21}$ and $G_{22}$ of quantized transform coefficients respectively corresponding to said first, second, third and fourth input blocks of data in said 2×2 array;

generating a transformation from the transform coefficients of each original input block into transform coefficients for a new hybrid block;

generating constants from input quantization values for each transform coefficient for said input blocks and from the output quantization values for each transform coefficient for said hybrid block; and shifting the blocks $G_{11}$, $G_{12}$, $G_{21}$ and $G_{22}$ in two dimensions by (i) combining quantized transform coefficients to shift a first pair of adjacent blocks along a first axis selected from the blocks $G_{11}$, $G_{12}$, $G_{21}$ and $G_{22}$ and composed of contiguous $\sigma_1$ samples of a first block of the first pair followed by contiguous $N_1-\sigma_1$ samples of a second block of the first pair along said first axis to generate a first intermediate hybrid block $F_1$ in the transform domain, (ii) combining quantized transform coefficients to shift a second pair of remaining adjacent blocks from the blocks $G_{11}$, $G_{12}$, $G_{21}$ and $G_{22}$ along said first axis and composed of contiguous $\sigma_1$ samples of a first block of the second pair followed by contiguous $N_1-\sigma_1$ samples of a second block of the second pair along said first axis to generate a second intermediate hybrid block $F_2$ in the transform domain, and (iii) combining quantized coefficients of the first intermediate hybrid block $F_1$ with transform coefficients from the second intermediate hybrid block $F_2$ composed of contiguous $\sigma_2$ samples from one block and $N_2-\sigma_2$ from the other block along a second axis orthogonal to the first axis, where the first, second, third and fourth input blocks are $N_1 \times N_2$ and $\sigma_1$ and $\sigma_2$ are shift parameters for the first and second dimensions, respectively, and $N_1 > \sigma_1$ and $N_2 > \sigma_2$, yielding the quantized transform coefficients of the hybrid block F in the transform domain.

31. The computer implemented method for transform domain processing of transformed data recited in claim 30, further comprising the step of zeroing intermediate high-precision quantized transform coefficients whose magnitudes are below a threshold between the shift operations on the two axes.

\* \* \* \* \*